US011235608B2

(12) United States Patent
Iida et al.

(10) Patent No.: US 11,235,608 B2
(45) Date of Patent: **\*Feb. 1, 2022**

(54) METHOD FOR FORMING PRINTED MATERIAL AND SYSTEM FOR FORMING PRINTED MATERIAL

(71) Applicant: FUJI XEROX CO., LTD., Tokyo (JP)

(72) Inventors: Yoshifumi Iida, Kanagawa (JP);
Satoshi Kamiwaki, Kanagawa (JP);
Sakae Takeuchi, Kanagawa (JP);
Satomi Kashiwagi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 88 days.

This patent is subject to a terminal disclaimer.

(21) Appl. No.: 16/781,229

(22) Filed: Feb. 4, 2020

(65) Prior Publication Data
US 2021/0016587 A1 Jan. 21, 2021

(30) Foreign Application Priority Data
Jul. 17, 2019 (JP) .............................. JP2019-132147

(51) Int. Cl.
*B41M 5/00* (2006.01)
*B41J 2/315* (2006.01)
(Continued)

(52) U.S. Cl.
CPC ............ *B41M 5/0011* (2013.01); *B41J 2/315* (2013.01); *B41J 11/002* (2013.01); *B41M 5/502* (2013.01);
(Continued)

(58) Field of Classification Search
CPC ... B32B 38/145; B32B 38/0036; B32B 27/08; B32B 27/302; B32B 37/10; B32B 7/12;
(Continued)

(56) References Cited

U.S. PATENT DOCUMENTS

| 5,847,738 A * | 12/1998 | Tutt ..................... B41M 7/0027 347/101 |
| 6,585,367 B2 * | 7/2003 | Gore .................... B41J 11/0015 347/102 |

(Continued)

FOREIGN PATENT DOCUMENTS

| JP | 2008-173917 A | 7/2008 |
| JP | 2008-179018 A | 8/2008 |

*Primary Examiner* — Manish S Shah
(74) *Attorney, Agent, or Firm* — Sughrue Mion, PLLC

(57) ABSTRACT

A method for forming a printed material includes forming an image on a recording medium; applying particles to a surface of the recording medium, the surface having the image formed thereon; heating the particles applied to the recording medium; and pressurizing, in a thickness direction, a multilayer body obtained by folding the recording medium so that the heated particles are sandwiched between flaps of the recording medium or a multilayer body obtained by placing another medium on top of the recording medium with the heated particles therebetween. The particles contain a styrene resin and a (meth)acrylic acid ester resin. The (meth)acrylic acid ester resin contains two (meth)acrylic acid ester monomer units, and a mass ratio of the (meth) acrylic acid ester monomer units relative to a total of polymerization components is 90 mass % or more.

18 Claims, 1 Drawing Sheet

(51) Int. Cl.
*B41J 11/00* (2006.01)
*G11B 5/72* (2006.01)
*G11B 5/702* (2006.01)
*C09D 133/10* (2006.01)
*B41M 5/50* (2006.01)
*B41J 2/01* (2006.01)

(52) U.S. Cl.
CPC .......... *C09D 133/10* (2013.01); *G11B 5/7023* (2013.01); *G11B 5/72* (2013.01); *B41J 2002/012* (2013.01)

(58) Field of Classification Search
CPC ... B32B 2255/10; B32B 2255/12; B32B 5/26; B32B 5/022; B32B 29/005; B32B 2307/748; B32B 2255/02; B32B 2255/26; B32B 2307/75; B41J 11/0015; B41J 11/0021; B41J 2/2107; B41J 2/01; B41J 11/002; B41J 5/0023; B41J 2/211; B41J 2/1433; B41J 2/17; B41J 2/17593; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C08F 257/02; C08F 212/08; C08F 220/1804; C08F 220/06; C08F 220/1808; B41M 7/009; B41M 7/00; B41M 5/0023; B41M 7/0081; B41M 3/006; B41M 3/003; B41M 5/0011; B41M 5/0017; B41M 5/0047; B41M 7/0072; B41M 5/52; B41M 5/5218; B41M 5/5227; C09D 125/14; C09D 133/04; C09D 11/107; C09D 11/322; C09D 11/101; C09D 11/326; C09D 11/38; C09D 11/36; C09D 11/40; C09D 11/30; C09D 11/32; C09D 11/324; C09D 11/328; C09D 11/102; C09D 11/005; C09D 11/54; C09D 11/52; C09D 11/106; C09D 11/03; C09D 11/037; C09D 11/033; C08L 25/12; G02B 5/20; G02B 5/223; C08K 3/11; C08K 2003/2237

See application file for complete search history.

(56) References Cited

U.S. PATENT DOCUMENTS

| | | | |
|---|---|---|---|
| 2003/0013033 A1* | 1/2003 | Kwasny | B41J 11/0015 430/122.1 |
| 2003/0068571 A1* | 4/2003 | Uehara | B41J 2/0057 430/125.32 |
| 2005/0212882 A1* | 9/2005 | Naniwa | B41J 11/0015 347/102 |
| 2007/0195145 A1* | 8/2007 | Yamashita | B41J 2/2114 347/101 |
| 2009/0227728 A1* | 9/2009 | Doi | B41J 2/0057 524/556 |
| 2010/0073448 A1* | 3/2010 | Ikuno | B41J 11/002 347/102 |
| 2010/0265292 A1* | 10/2010 | Ohshima | B41J 2/162 347/16 |
| 2011/0242200 A1* | 10/2011 | Tojo | B41J 2/2107 347/21 |
| 2012/0082488 A1* | 4/2012 | Kubo | G03G 15/162 399/302 |
| 2013/0100222 A1* | 4/2013 | Nieda | B41J 11/663 347/104 |
| 2013/0250021 A1* | 9/2013 | Shimomura | B41J 2/0057 347/103 |

* cited by examiner

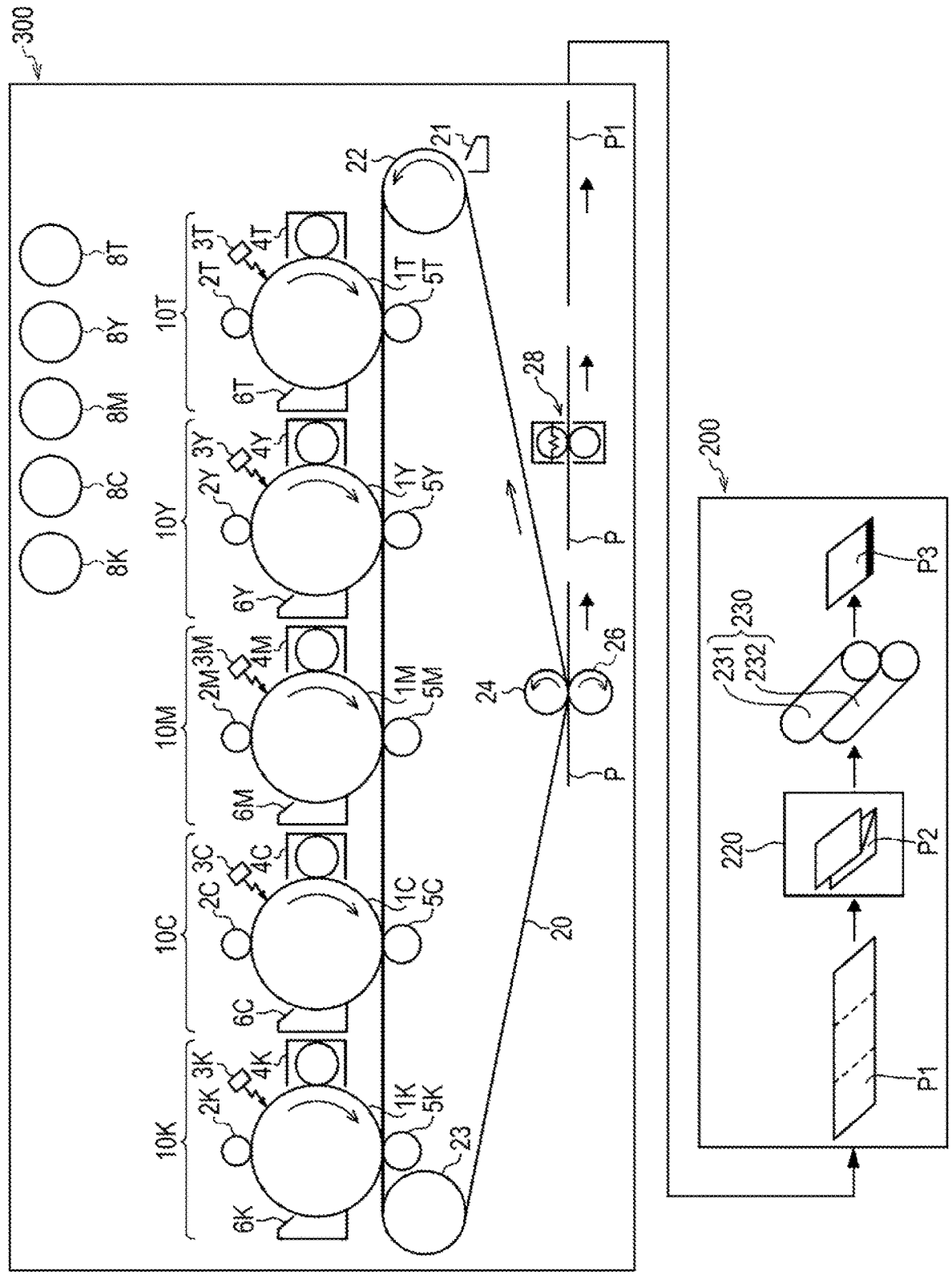

METHOD FOR FORMING PRINTED MATERIAL AND SYSTEM FOR FORMING PRINTED MATERIAL

CROSS-REFERENCE TO RELATED APPLICATIONS

This application is based on and claims priority under 35 USC 119 from Japanese Patent Application No. 2019-132147 filed Jul. 17, 2019.

BACKGROUND

(i) Technical Field

The present disclosure relates to a method for forming a printed material and a system for forming a printed material.

(ii) Related Art

Japanese Unexamined Patent Application Publication No. 2008-173917 describes an apparatus for producing a press-bonded sheet. This apparatus is used to bond sheets with powder particles serving as an adhesive, and fixing units for thermally fixing the adhesive to the sheets are provided at two places in this apparatus.

Japanese Unexamined Patent Application Publication No. 2008-179018 describes a press-bonded paper sheet manufacturing apparatus that manufactures a press-bonded paper sheet from a sheet-shaped member. This press-bonded paper sheet manufacturing apparatus is equipped with at least an applying unit that applies a re-peelable adhesive to the sheet-shaped member; a fixing unit that fixes the adhesive applied by the applying unit; a bending unit that bends the sheet-shaped member with the adhesive fixed thereto by the fixing unit; a press-bonding unit that performs press bonding by applying heat and pressure to the sheet-shaped member bent by the bending unit; a reading unit that reads address information on an address surface of the press-bonded paper sheet; and a weight measuring unit that measures the weight of the press-bonded paper sheet.

SUMMARY

Aspects of non-limiting embodiments of the present disclosure relate to a method for forming a printed material, with which the range of choice of the usable recording medium is wide and a printed material having high peel strength can be formed, compared to when the heating the particles applied to the recording medium is not performed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a method for forming a printed material includes: forming an image on a recording medium; applying particles to a surface of the recording medium, the surface having the image formed thereon; heating the particles applied to the recording medium; and pressurizing, in a thickness direction, a multilayer body obtained by folding the recording medium so that the heated particles are sandwiched between flaps of the recording medium or a multilayer body obtained by placing another medium on top of the recording medium with the heated particles therebetween. The particles contain a styrene resin and a (meth)acrylic acid ester resin. The (meth)acrylic acid ester resin contains two (meth)acrylic acid ester monomer units, and a mass ratio of the (meth)acrylic acid ester monomer units relative to a total of polymerization components is 90 mass % or more. The particles have two glass transition temperatures, and a difference between the lowest glass transition temperature and the highest glass transition temperature is 30° C. or more.

BRIEF DESCRIPTION OF THE DRAWINGS

Exemplary embodiments of the present disclosure will be described in detail based on the following figure, wherein:

FIGURE is a schematic diagram illustrating one example of a system for forming a printed material according to an exemplary embodiment.

DETAILED DESCRIPTION

Exemplary embodiments of the present disclosure will now be described. The following descriptions and examples are merely exemplary embodiments and do not limit the scopes of the exemplary embodiments.

In the present disclosure, the numerical range that uses "to" indicates an inclusive range in which the values preceding and following the word "to" are included as the minimum value and the maximum value, respectively, of the range.

When numerical ranges are described stepwise in the present disclosure, the upper limit or the lower limit of one numerical range may be substituted with an upper limit or a lower limit of a different numerical range also described stepwise. In the numerical ranges described in the present disclosure, the upper limit or the lower limit of one numerical range may be substituted with a value indicated in Examples.

In the present disclosure, when a drawing is referred to describe an exemplary embodiment, the structure of that exemplary embodiment is not limited to the structure illustrated in the drawing. Moreover, the size of a member in each drawing is schematic, and the relative size relationship between the members is not limited to what is illustrated.

In the present disclosure, each component may contain more than one corresponding substances. In the present disclosure, when the amount of a component in a composition is referred and when there are two or more substances that correspond to that component in the composition, the amount is the total amount of the two or more substances in the composition unless otherwise noted.

In the present disclosure, particles corresponding to each component may contain more than one types of particles. When there are more than one types of particles corresponding to one component in the composition, the particle diameter of each component is a particle diameter of a mixture of the more than one types of particles present in the composition unless otherwise noted.

In the present disclosure, the notation "(meth)acryl" means "acryl" or "methacryl".

In the present disclosure, a printed material formed by folding a recording medium and bonding opposing surfaces of flaps or a printed material formed by placing two or more media, such as a recording medium and another medium, on top of each other and bonding opposing surfaces of the media is referred to as a "press-bonded printed material". These opposing surfaces formed by folding the recording medium or placing another medium on the recording medium may be simply referred to as "opposing surfaces of the recording medium" hereinafter.

In the present disclosure, the "peel strength" is an indicator of the degree of peeling between opposing surfaces of the recording medium, and is substantially equivalent to the "bondability" that indicates the degree of bonding. In the description below, the term "peel strength" indicates the peel strength between the opposing surfaces of the recording medium, and the term "bondability" indicates the bondability between the opposing surfaces of the recording medium.

Method for Forming Printed Material and System for Forming Printed Material

A method for forming a printed material according to an exemplary embodiment includes: forming an image on a recording medium; applying particles onto the recording medium having the image formed thereon; heating the particles applied to the recording medium; and pressurizing a multilayer body in a thickness direction, the multilayer body being obtained by folding the recording medium so that the heated particles are sandwiched between flaps of the recording medium or by placing another medium on top of the recording medium with the heated particles therebetween.

The particles applied to the recording medium (hereinafter these particles may be referred to as the "particular particles") contain: a styrene resin containing styrene monomer unit and other vinyl monomer unit; and a (meth)acrylic acid ester resin that contains at least two (meth)acrylic acid ester monomer units, in which the mass ratio of the (meth)acrylic acid ester monomer units relative to the total of polymerization components is 90 mass % or more. The particles have at least two glass transition temperatures, and the difference between the highest glass transition temperature and the lowest glass transition temperature is 30° C. or more.

First, the particular particles used in this exemplary embodiment are particles that undergo pressure-induced phase transition by exhibiting thermal properties, namely, "having at least two glass transition temperatures, in which the difference between the lowest glass transition temperature and the highest glass transition temperature is 30° C. or more".

In the present disclosure, the particles that undergo pressure-induced phase transition refer to particles that satisfy formula 1 below:

$$10°\ C. \leq T1 - T2 \qquad \text{Formula 1:}$$

In formula 1, T1 represents a temperature at which the viscosity is 10000 Pa·s at a pressure of 1 MPa, and T2 represents a temperature at which the viscosity is 10000 Pa·s at a pressure of 10 MPa. The method for determining T1 and T2 is described below.

The particular particles undergo the pressure-induced phase transition as described above, and thereby exhibit a function of bonding the opposing surfaces of the recording medium to each other in preparing a printed material.

In order to form a printed material, particles that undergo pressure-induced phase transition are placed between opposing surfaces of the recording medium, and then pressure is applied to the particles to bond the opposing surfaces of the recording medium.

In order to obtain the target peel strength (in other words, the bondability) between the bonded opposing surfaces of the recording medium, a very high pressure (for example, 48 MPa or more) is to be applied to the recording medium and the particles.

However, when such a high pressure is applied, issues such as wrinkling and breaking may arise depending on the type of recording medium (for example, the difference in basis weight), and the range from which the recording medium can be selected has been limited.

Thus, the inventors have considered a method for forming a printed material, with which the range of choice of the usable recording medium is wide and a printed material having high peel strength can be formed, and have found the above-described method for forming a printed material according to the exemplary embodiment.

The reason why the range of choice of the usable recording medium is wide and a printed material with high peel strength can be formed by the method for forming a printed material of this exemplary embodiment is presumably as follows.

The method for forming a printed material according to this exemplary embodiment includes heating the particular particles applied to the recording medium having an image thereon in the applying. Subsequently, in the pressurizing, a multilayer body obtained by folding a recording medium so that the heated particles are sandwiched between flaps of the recording medium or a multilayer body obtained by placing another medium on top of the recording medium with the heated particles therebetween is pressurized in the thickness direction.

Since the particular particles heated in the heating is plasticized, the particular particles rapidly undergo phase transition and exhibit bondability when pressurized in the subsequent pressurizing. Thus, compared to when the pressurizing is performed without performing the heating, the pressure applied to the multilayer body in the pressurizing can be decreased, and degradation of the peel strength can be suppressed despite the decreased pressure. In particular, since the particular particles readily undergo pressure-induced phase transition and have excellent bondability, the pressure applied to the multilayer body in the pressurizing can be further decreased, and degradation of the peel strength can be suppressed despite the further decreased pressure.

Presumably due to this reason, the range of choice of the usable recording medium is wide, and a printed material with high peel strength can be formed.

The reason why the particular particles readily undergo pressure-induced phase transition and have excellent bondability is presumably as follows.

Typically, a styrene resin and a (meth)acrylic acid ester resin have low compatibility to each other, and thus it is considered that these resins contained in the toner particles are in a phase separated state. When the particular particles are under pressure, a (meth)acrylic acid ester resin having a relatively low glass transition temperature is fluidized first, and this fluidization affects the styrene resin, resulting in fluidization of the two resins. It is also considered that when the two resins in the particular particles solidify and form a resin layer as the pressure is decreased after the two resins have fluidized under pressure, a phase separated state is again formed due to their low compatibility.

It is assumed that a (meth)acrylic acid ester resin that contains at least two (meth)acrylic acid ester monomer units is easily fluidizable under pressure because there are at least two types of ester groups bonded to the main chain and thus the degree of molecular alignment in a solid state is low compared to a homopolymer of a (meth)acrylic acid ester. Moreover, it is assumed that when the mass ratio of the (meth)acrylic acid ester monomer units relative to the total of the polymerization components is 90 mass % or more, at least two types of ester groups are present at a high density; thus, the degree of molecular alignment in a solid state becomes lower, and thus the resin becomes easily fluidizable under pressure. Thus, it is assumed that the particular particles are easily fluidizable under pressure, in other words, easily undergo pressure-induced phase transition, compared to a toner in which the (meth)acrylic acid ester resin is a homopolymer of a (meth)acrylic acid ester.

In addition, it is assumed that a (meth)acrylic acid ester resin containing at least two (meth)acrylic acid ester monomer units, in which the mass ratio of the (meth)acrylic acid ester monomer units relative to the total of polymerization components is 90 mass % or more, has a low degree of molecular alignment during re-solidification, and, thus, a microphase separation occurs with a styrene resin. The finer the state of phase separation between the styrene resin and the (meth)acrylic acid ester resin, the higher the uniformity of the state of the bonding surface to an adherend, and the more excellent the bondability. Thus, it is assumed that the particular particles have excellent bondability compared to particles in which the (meth)acrylic acid ester resin is a homopolymer of a (meth)acrylic acid ester.

A method for forming a printed material of this exemplary embodiment is performed in a system for forming a printed material according to an exemplary embodiment.

A system for forming a printed material according to an exemplary embodiment includes an image forming unit that forms an image on a recording unit; a particle applying unit that applies particles to a surface of the recording medium on which the image has been formed; a particle heating unit that heats the particles applied to the recording medium; and a multilayer body pressurizing unit that pressurizes a multilayer body in a thickness direction, the multilayer body being obtained by folding the recording medium so that the heated particles are sandwiched between flaps of the recording medium or by placing another medium on top of the recording medium with the heated particles therebetween.

The particles applied to the recording medium are the particular particles.

Hereinafter, the processes of the method for forming a printed material according to an exemplary embodiment are described together with the units of the system for forming a printed material according to an exemplary embodiment.

Forming and Image Forming Unit

In the forming, an image is formed on a recording medium.

The unit (image forming unit) that forms an image on a recording medium is not particularly limited, and may be any unit that can form an image (for example, a color image) on a recording medium.

Specifically, a known image forming unit such as an electrophotographic unit that uses a toner, an inkjet recording unit that uses an ink, or a unit that uses a printing plate is used as the unit for forming an image on a recording medium (image forming unit).

In particular, in the forming, from the viewpoint of continuously performing the forming and the applying, an image is preferably electrophotographically formed on a recording medium by using a toner. More specifically, the forming may be a process of electrophotographically forming an image composed of a color toner on a recording medium by using an electrostatic charge image developer containing the color toner.

In other words, the image forming unit may be an electrophotographic image forming unit.

Examples of the recording medium used in the forming include paper, coated paper obtained by coating the surface of paper with a resin or the like, cloths, nonwoven cloths, resin films, and resin sheets.

In the forming, an image is formed on one or both surfaces of the recording medium.

Applying and Particle Applying Unit

In the applying, particular particles are applied to the surface of the recording medium on which an image has been formed.

The unit for applying particular particles (particle applying unit) is not particularly limited and may be any unit that can apply a target amount of particular particles at a target application position on the surface of the recording medium on which the image has been formed.

Specific examples of the unit that applies the particular particles (particle applying unit) include an electrophotographic unit that uses the particular particles as a toner, a unit that sprays particular particles, and a coating unit that uses a coating solution containing dispersed particular particles.

In particular, from the viewpoints of ease of adjusting the application amount, ease of controlling the application position, etc., in the applying, the particular particles may be used as a toner and may be electrophotographically applied to the recording medium having an image formed thereon. More specifically, the applying may be a process of electrophotographically applying the particular particles to the recording medium by using an electrostatic charge image developer containing the particular particles as a toner.

In other words, the particle applying unit may be an electrophotographic particle applying unit that uses the particular particles as a toner.

Applied State of Particular Particles

The applied state of the particular particles may be a state in which the particle shape remains or a state in which the particular particles are gathered to form a layer. From the viewpoint of obtaining sufficient peel strength (or bondability), the particular particles may form a layer.

The layer formed of the particular particles may be a continuous layer or a discontinuous layer.

From the viewpoint of obtaining sufficient peel strength (or bondability), the application amount of the particular particles is preferably 0.5 $g/m^2$ or more and 8.0 $g/m^2$ or less, more preferably 1.0 $g/m^2$ or more and 6.0 $g/m^2$ or less, and yet more preferably 1.5 $g/m^2$ or more and 5.0 $g/m^2$ or less.

Application Position of Particular Particles

The application position of the particular particles may be the entire surface or a part of the surface of the recording medium.

The position where the particular particles are applied to the recording medium may be on the image formed on the recording medium, on the non-image region of the recording medium, or both. Specifically, for example, a solid image formed of the particular particles may be applied to at least part of a non-image region, dots formed of the particular particles may be applied to at least part of an image region, or a solid image formed of the particular particles may be placed on at least part of an image.

As described below, the particular particles may be transparent.

When the particular particles are applied to an image region of the recording medium and when the particular particles are transparent, the visibility of the image region is improved.

In this exemplary embodiment, "transparent" means that the average transmittance of the region in which the particular particles are applied is 10% or more for light in the visible range (400 nm or more and 700 nm or less). The average transmittance is preferably 50% or more, more preferably 80% or more, and yet more preferably 90% or more.

The average transmittance is measured with a spectrophotometer V700 (produced by JASCO Corporation).

Electrophotographic Application of Particular Particles

The particular particles may be electrophotographically applied by the particle application method described below.

The particle application method described below is performed by using a particle application apparatus described below.

Here, a region where the particular particles serving as a toner are applied is referred to as a "toner image" for the sake of convenience.

Particle Application Method and Particle Application Apparatus

An electrophotographic particle application method includes a charging process of charging a surface of an image carrier; an electrostatic charge image forming process of forming an electrostatic charge image on the charged surface of the image carrier; a developing process of developing the electrostatic charge image on the surface of the image carrier into a toner image by using an electrostatic charge image developer containing the particular particles as a toner; and a transfer process of transferring the toner image on the surface of the image carrier onto a surface of a recording medium.

An electrophotographic particle application apparatus includes an image carrier; a charging unit that charges a surface of the image carrier; an electrostatic charge image forming unit that forms an electrostatic charge image on the charged surface of the image carrier; a developing unit that contains an electrostatic charge image developer containing the particular particles as a toner and develops the electrostatic charge image on the surface of the image carrier by using the electrostatic charge image developer so as to form a toner image; and a transfer unit that transfers the toner image on the surface of the image carrier onto a surface of a recording medium.

In the particle application apparatus described above, a section including the developing unit may be configured as a cartridge structure (process cartridge) that is detachably attachable to the particle application apparatus. A process cartridge detachably attachable to the particle application apparatus and equipped with a developing unit containing an electrostatic charge image developer that contains the particular particles as a toner may be used as this process cartridge.

The particle application method and the particle application apparatus described above respectively correspond to an electrophotographic image forming method and an electrophotographic image forming apparatus. Thus, the respective processes of the particle application method and the respective units in the particle application apparatus may be any known processes and units that are employed in the electrophotographic image forming method and image forming apparatus.

The particle application method and the particle application apparatus may employ an intermediate transfer system. For example, a toner image formed on the surface of the image carrier is first transferred onto a surface of an intermediate transfer body and then finally transferred from the surface of the intermediate transfer body to a surface of a recording medium.

Furthermore, the particle application method and the particle application apparatus described above may further include units and processes other than those described above, for example, a process of cleaning the surface of the image carrier, a unit that cleans the surface of the image carrier, a device equipped with a charge erasing unit that erases charges by irradiating the surface of the image carrier with charge erasing light.

In this exemplary embodiment, the forming and the applying may be performed continuously.

Specifically, a toner composite image may be formed on a surface of an image carrier or an intermediate transfer body by using both a toner (preferably a color toner) for forming an image in the forming and a toner formed of the particular particles in the applying, and then be transferred onto a surface of a recording medium.

When the toner composite image is transferred to the surface of the recording medium, the toner image formed of the particular particles is arranged to be superimposed on part or the entirety of the toner image for forming an image and on a non-image region of the toner image for forming an image.

In this exemplary embodiment, from the viewpoint of obtaining the target peel strength (or bondability), the volume average particle diameter "$D_A$" of the color toner used in the forming and the volume average particle diameter "$D_B$" of the toner containing the particular particles used in the applying are set so that the ratio ($D_B/D_A$) of the volume-average particle diameter $D_B$ to the volume average particle diameter $D_A$ is 0.5 or more and 3.0 or less, preferably 0.7 or more and 2.7 or less, and more preferably 0.8 or more and 2.5 or less.

The method for measuring the volume-average particle diameter $D_A$ and the volume average particle diameter $D_B$ is described below.

Heating and Particle Heating Unit

In the heating, the particular particles applied to the recording medium are heated.

The unit that heats the particular particles (particle heating unit) is not particularly limited and may be any unit that can heat the particular particles applied to the recording medium.

The unit that heats the particular particles (particle heating unit) may be of a contact type or a non-contact type.

A contact-type particle heating unit may involve heating a member, such as a roll, a belt, or a pad, and causing the heated member to contact the particular particles, for example.

A non-contact-type particle heating unit may involve passing a recording medium with the particular particles applied thereto through a zone heated with a heater, an oven, or the like, or may involve heating the particular particles with illuminating light from a halogen lamp, xenon lamp, or the like.

In particular, from the viewpoint of heating the particular particles and suppressing movement, detachment, etc., of the particular particles, a contact-type particle heating unit may be used in the heating.

In other words, the particle heating unit may be a contact-type particle heating unit.

Heating Particular Particles by Contact-Type Method

In order to heat the particular particles by a contact-type method, the set temperature of the member (also referred to as a contact member) contacting the particular particles may be any temperature at which the particular particles are plasticized. However, from the viewpoint of efficiency of heating the particular particles, etc., the set temperature is, for example, preferably 120° C. or more and 250° C. or less, more preferably 130° C. or more and 200° C. or less, and yet more preferably 150° C. or more and 180° C. or less.

Here, the set temperature of the contact member refers to the target value of the surface temperature of the contact member contacting the particular particles.

The contact member may be any member that has a surface heated to the aforementioned set temperature, and examples thereof include a roll, a belt, and a pad.

The heating may be a process of heating and pressurizing the particular particles.

When the particular particles are heated and pressurized simultaneously, the particular particle-applied surface (for example, the surface of a layer formed of the particular particles) can be made flat and smooth.

The pressure applied to the particular particles in the heating is, for example, pressure applied by the fixing unit by an electrophotographic method.

Examples of the unit that heats and pressurizes the particular particles (this unit is also referred to as a heating and pressurizing member) are as follows:

A heating and pressurizing roll pair constituted by two contacting rolls at least one of which applies heat and between which a recording medium with the particular particles applied thereto is passed to be heated and pressurized; a heating and pressurizing member constituted by a roll and a belt in contact with each other, in which at least one of the roll and the belt applies heat, and a recording medium with the particular particles applied thereto is passed between the roll and the belt to be heated and pressurized; and a heating and pressurizing belt pair constituted by two contacting belts at least one of which applies heat and between which a recording medium with the particular particles applied thereto is passed to be heated and pressurized.

Pressurizing and Multilayer Body Pressurizing Unit

In the pressurizing, a multilayer body obtained by folding a recording medium so that the heated particles are sandwiched between flaps of the recording medium or a multilayer body obtained by placing another medium on top of a recording medium with the heated particles therebetween is pressurized in the thickness direction.

The way in which the recording medium is folded may be in two, in three, or in four, and only part of the recording medium may be in fold. At this stage, the particular particles heated in the heating are disposed on at least part of at least one surface of the two opposing surfaces of the flaps of the recording medium.

The way in which a recording medium and another medium are placed on top of each other may be, for example, placing one medium on top of the recording medium, or placing one medium on each of multiple sections on the recording medium. This other medium may have an image formed on one or both surfaces in advance, may be free of any image, or may be a press-bonded printed material prepared in advance. At this stage, the particular particles heated in the heating are disposed on at least part of at least one surface of the two opposing surfaces of the recording medium and the other medium.

The unit that pressurizes the multilayer body (multilayer body pressurizing unit) may be any unit that can pressurize the multilayer body in the thickness direction, and may be, for example, a unit that allows the multilayer body to pass between a pair of rolls or a unit that pressurizes the multilayer body by using a pressing machine or the like.

In particular, the pressurizing may be a process of causing the multilayer body to pass between a pair of rolls separated from each other by an interval C and pressurizing the multilayer body in the thickness direction.

In other words, the multilayer body pressurizing unit may be a unit that causes a multilayer body to pass between a pair of rolls separated from each other by an interval C and pressurizes the multilayer body in the thickness direction.

Here, the interval C may be appropriately determined on the basis of the thickness of the multilayer body to be pressurized from the viewpoint of obtaining the target peel strength (or bondability), and is preferably 0.01 mm or more and 0.40 mm or less, more preferably 0.05 mm or more and 0.30 mm or less, and yet more preferably 0.10 mm or more and 0.25 mm or less, for example.

Pressurizing Conditions

The pressure applied in the thickness direction of the multilayer body (hereinafter this pressure may be referred to as the "press bonding pressure") is preferably 48 MPa or more and 120 MPa or less, more preferably 60 MPa or more and 110 MPa or less, and yet more preferably 80 MPa or more and 100 MPa or less in terms of maximum pressure.

At a press bonding pressure of 48 MPa or more, sufficient bondability is easily obtained. At a press bonding pressure of 120 MPa or less, breaking, deformation, etc., of the recording medium during pressurizing are easily suppressed.

The press bonding pressure is measured by a commercially available pressure measuring film. A specific example of the pressure measuring film is a pressure measuring film, PRESCALE produced by FUJIFILM Corporation. Here, the "maximum pressure" is the maximum value observed as the pressure applied to the multilayer body by the multilayer body pressurizing unit is changed.

The multilayer body pressurizing unit may be a commercially available device. Specific examples thereof include PRESSLE LEADA, PRESSLE CORE, and PRESSLE Bee produced by Toppan Forms Co., Ltd., and PS-500H, PS-500, EX-4100WI, EX-4100W, EX-4100/4150, and PS-100 produced by DUPLO SEIKO CORPORATION.

The pressurizing may be performed without heating or with heating.

In other words, the multilayer body pressurizing unit may be free of a heating unit and may pressurize the multilayer body without heating, or may be equipped with a heating unit and may heat the multilayer body while heating.

The method for forming a printed material according to this exemplary embodiment may include additional processes in addition to the forming to the pressurizing described above.

An example of the additional processes is a process of cutting the recording medium after the heating or the multilayer body after the pressurizing into a target size.

In the description below, one example of a system for forming a printed material according to an exemplary embodiment is described, and a method for forming a printed material according to an exemplary embodiment is described; however, the exemplary embodiments are not limited by the description below.

FIGURE is a schematic diagram illustrating one example of a system for forming a printed material according to an exemplary embodiment. The system for forming a printed material illustrated in FIGURE is equipped with a printing unit 300 that forms color images on and applies particular particles to a recording medium, and a press bonding unit 200 disposed downstream of the printing unit 300.

The printing unit 300 is a five-stand-tandem intermediate transfer-type printing unit.

The printing unit 300 is equipped with a unit 10T that applies the particular particles (T), and units 10Y, 10M, 10C, and 10K that respectively form yellow (Y), magenta (M), cyan (C), and black (K) images. The unit 10T is the particle applying unit that applies the particular particles to a recording medium P by using a developer that contains the particular particles. Each of the units 10Y, 10M, 10C 10K is a unit that forms a color image on the recording medium P by using a developer that contains a color toner. The units 10T, 10Y, 10M, 10C, and 10K employ an electrophotographic system.

The units 10T, 10Y, 10M, 10C, and 10K are disposed side by side with spaces therebetween in the horizontal direction. The units 10T, 10Y, 10M, 10C, and 10K may each be a process cartridge detachably attachable to the printing unit 300.

An intermediate transfer belt (one example of the intermediate transfer body) 20 extends below and throughout the units 10T, 10Y, 10M, 10C, and 10K. The intermediate transfer belt 20 is wound around a driving roll 22, a supporting roll 23, and a counter roll 24 that are in contact with the inner surface of the intermediate transfer belt 20, and runs in a direction from the unit 10T to the unit 10K. An intermediate transfer body cleaning device 21 is installed on the image carrying surface side of the intermediate transfer belt 20 so as to face the driving roll 22.

The units 10T, 10Y, 10M, 10C, and 10K are respectively equipped with developing devices (examples of the developing units) 4T, 4Y, 4M, 4C, and 4K. Particular particles, a yellow toner, a magenta toner, a cyan toner, and a black toner contained in cartridges 8T, 8Y, 8M, 8C, and 8K are respectively supplied to the developing devices 4T, 4Y, 4M, 4C, and 4K.

Since the units 10T, 10Y, 10M, 10C, and 10K are identical in structure and in operation, the unit 10T that applies the particular particles to the recording medium is described as a representative example.

The unit 10T has a photoreceptor (an example of the image carrier) 1T. A charging roll (one example of the charging unit) 2T that charges the surface of the photoreceptor 1T, an exposing device (one example of the electrostatic charge image forming unit) 3T that forms an electrostatic charge image by exposing the charged surface of the photoreceptor 1T with a laser beam, a developing device (one example of the developing unit) 4T that develops the electrostatic charge image into a toner image by supplying the particular particles serving as a toner to the electrostatic charge image, a first transfer roll (one example of the first transfer unit) 5T that transfers the developed toner image onto the intermediate transfer belt 20, and a photoreceptor cleaning device (one example of the cleaning unit) 6T that removes the particular particles remaining on the surface of the photoreceptor 1T after the first transfer are provided in that order around the photoreceptor 1T. The first transfer roll 5T is disposed on the inner side of the intermediate transfer belt 20 and is positioned to face the photoreceptor 1T.

In the description below, operation of applying the particular particles to the recording medium P and forming color images is described by describing the operation of the unit 10T as an example.

First, the surface of the photoreceptor 1T is charged by the charging roll 2T. The developing device 3T applies a laser beam onto the charged surface of the photoreceptor 1T in accordance to image data sent from a controller (not illustrated). As a result, an electrostatic charge image, which is the region where the particular particles are to be applied, is formed on the surface of the photoreceptor 1T.

The electrostatic charge image formed on the photoreceptor 1T is rotated to a developing position as the photoreceptor 1T is run. The electrostatic charge image on the photoreceptor 1T is developed by the developing device 4T at this developing position so as to form a toner image.

A developer that contains at least the particular particles and a carrier is contained in the developing device 4T. The particular particles are frictionally charged as they are stirred with the carrier in the developing device 4T, and are carried on the developer roll. As the surface of the photoreceptor 1T passes the developing device 4T, the particular particles electrostatically adhere to the electrostatic charge image on the surface of the photoreceptor 1T, and the electrostatic charge image is thereby developed with the particular particles. The photoreceptor 1T on which the toner image formed of the particular particles is formed is continuously run, and the developed toner image on the photoreceptor 1T is conveyed to a first transfer position.

After the toner image on the photoreceptor 1T is conveyed to the first transfer position, a first transfer bias is applied to the first transfer roll 5T. Electrostatic force working from the photoreceptor 1T toward the first transfer roll 5T also works on the toner image, and the toner image on the photoreceptor 1T is transferred onto the intermediate transfer belt 20. The particular particles remaining on the photoreceptor 1T are removed by the photoreceptor cleaning device 6T and recovered. The photoreceptor cleaning device 6T is, for example, a cleaning blade or a cleaning brush, and is preferably a cleaning brush.

An operation similar to that performed in the unit 10T is also performed in the units 10Y, 10M, 10C, and 10K by using developers that contain color toners. The intermediate transfer belt 20 onto which the toner image formed of the particular particles is formed in the unit 10T sequentially passes the units 10Y, 10M, 10C, and 10K, and toner images of respective colors are transferred onto the intermediate transfer belt 20 in a superimposing manner.

The intermediate transfer belt 20 onto which five toner images are transferred and superimposed as the intermediate transfer belt 20 passes the units 10T, 10Y, 10M, 10C, and 10K reaches a second transfer section constituted by the intermediate transfer belt 20, the counter roll 24 in contact with the inner surface of the intermediate transfer belt 20, and a second transfer roll (one example of the second transfer unit) 26 disposed on the image carrying surface side of the intermediate transfer belt 20. Meanwhile, a recording sheet P is supplied to a gap where the second transfer roll 26 and the intermediate transfer belt 20 contact each other via a supplying mechanism, and a second transfer bias is applied to the counter roll 24. During this process, an electrostatic force working from the intermediate transfer belt 20 toward the recording medium P acts on the toner images, and the toner images on the intermediate transfer belt 20 are transferred onto the recording medium P.

The recording medium P onto which the toner images have been transferred is conveyed to a heating device (one example of the particle heating unit) 28. The color toner images are thermally fixed to the recording medium P by being heated by the heating device 28, and, at the same time, the toner image formed of the particular particles is also heated, and plasticization of the particular particles is promoted.

From the viewpoint of suppressing detachment of the particular particles from the recording medium P, the viewpoint of improving the fixability of the color toners to the recording medium P, and the viewpoint of promoting plasticization of the particular particles, the heating device 28 may be a device that applies both heat and pressure (this device is also referred to as a "heating and pressurizing device").

When the heating device 28 is a heating and pressurizing device, for example, the heating device 28 may be equipped with a heating source such as a halogen heater, and may include a pair of rolls that contact and heat the toner images on the recording medium P. The color toner images are thermally fixed to the recording medium P as the recording medium carrying the toner images pass between the pair of rolls, and, at the same time, the toner image formed of the particular particles is heated and plasticization of the particular particles is promoted.

As described above, the recording medium P passes the printing unit 300, and thus becomes a recording medium P1 on which color images are formed and to which the particular particles are applied.

The recording medium P1 is then conveyed toward the press bonding unit 200.

In the system for forming a printed material according to this exemplary embodiment, the printing unit 300 and the press bonding unit 200 may be close to each other or distant from each other.

When the printing unit 300 and the press bonding unit 200 are distant from each other, the printing unit 300 and the press bonding unit 200 are, for example, linked via a conveying unit (for example, a belt conveyor) that conveys the recording medium P1.

The press bonding unit 200 is equipped with a folding device 220 and a pressurizing device 230, and folds and press-bonds the recording medium P1.

The folding device 220 folds the recording medium P1 passing therethrough to prepare a folded recording medium (in other words, multilayer body) P2.

In the folded recording medium (in other words, multilayer body), the particular particles applied by the printing device 300 are disposed on at least part of at least one surface of the two opposing surfaces of flaps of the recording medium.

The press bonding unit 200 may be equipped with a superimposing device that places another medium on top of the recording medium P1 instead of the folding device 220.

In the recording medium (in other words, multilayer body) P2 obtained by using the superimposing device, the particular particles applied by the printing device 300 are disposed on at least part of at least one of the surface of the recording medium and the surface of the additional medium.

The recording medium P2 exits the folding device 220 (or superimposing device) and is conveyed toward the pressurizing device 230.

The pressurizing device 230 is equipped with, for example, a pair of rolls (in other words, pressurizing rolls 231 and 232). There is an interval C between the pressurizing roll 231 and the pressurizing roll 232, and as the recording medium P2 passes between the pair of rolls, pressure is applied to the recording medium P2 in the thickness direction.

As the recording medium P2 passing the pressurizing device 230 is pressurized, the superimposed surfaces become bonded with each other with the fluidized particular particles, and a press-bonded printed material P3 is obtained.

In the obtained press-bonded printed material P3, the opposing surfaces are partly or entirely bonded to each other.

The finished press-bonded printed material P3 is discharged from the pressurizing device 230.

A first model of the press-bonded printed material P3 is a press-bonded printed material in which a folded recording medium has opposing surfaces of flaps bonded to each other with the particular particles.

This press-bonded printed material P3 is formed by a system for forming a printed material equipped with a folding device 220.

A second model of the press-bonded printed material P3 is a press-bonded printed material in which multiple recording media placed on top of each other have opposing surfaces bonded to each other with the particular particles.

This press-bonded printed material P3 is formed by a system for forming a printed material equipped with a superimposing device.

The system for forming a printed material according to this exemplary embodiment is not limited to a type that continuously conveys the recording medium P2 from the folding device 220 (or superimposing device) to the pressurizing device 230.

The system for forming a printed material according to this exemplary embodiment may be of a type that stocks the recording media P2 discharged from the folding device 220 (or superimposing device) and conveys the recording media P2 to the pressurizing device 230 after a predetermined amount of the recording media P2 are stored.

In the system for forming a printed material according to this exemplary embodiment, the folding device 220 (or superimposing device) and the pressurizing device 230 may be close to each other or distant from each other. When the folding device 220 (or superimposing device) and the pressurizing device 230 are distant from each other, the folding device 220 (of superimposing device) and the pressurizing device 230 are, for example, linked via a conveying unit (for example, a belt conveyor) that conveys the recording medium P2.

The system for forming a printed material according to this exemplary embodiment may be equipped with a cutting unit that cuts the recording medium into a predetermined size. Examples of the cutting unit include a cutting unit that is disposed between the printing unit 300 and the press-bonding unit 200 and cuts off a part of the recording medium P1, the part being a region where no particular particles are placed; a cutting unit that is disposed between the folding device 220 and the pressurizing device 230 and cuts off a part of the recording medium P2, the part being a region where no particular particles are placed; and a cutting unit that is disposed downstream of the press-bonding unit 200 and cuts off a part of the press-bonded printed material P3, the part being a region not bonded with the particular particles.

The cutting unit may cut off a part of the region where the particular particles are placed.

The system for forming a printed material according to this exemplary embodiment is not limited to a single-sheet type. The system for forming a printed material according to this exemplary embodiment may be of a type that performs a placing process and a press bonding process on a long recording medium to form a long press-bonded printed material, and then cuts the long press-bonded printed material into a predetermined size.

Particular Particles

The particular particles of the exemplary embodiment contain at least base particles and, if needed, an external additive.

The base particles contained in the particular particles contain: a styrene resin containing styrene monomer unit and other vinyl monomer unit; and a (meth)acrylic acid ester resin that contains at least two (meth)acrylic acid ester monomer units, in which the mass ratio of the (meth)acrylic acid ester monomer units relative to the total of polymerization components is 90 mass % or more. The base particles have at least two glass transition temperatures, and the difference between the highest glass transition temperature and the lowest glass transition temperature is 30° C. or more.

Base Particles

Binder Resin

The base particles contain, as a binder resin, a styrene resin containing styrene monomer unit and other vinyl monomer unit, and a (meth)acrylic acid ester resin that contains at least two (meth)acrylic acid ester monomer units, in which the mass ratio of the (meth)acrylic acid ester monomer units relative to the total of polymerization components is 90 mass % or more.

In the description below, a "styrene resin that contains styrene monomer unit and other vinyl monomer unit" may be simply referred to as a "particular styrene resin", and a "(meth)acrylic acid ester resin that contains at least two (meth)acrylic acid ester monomer units, in which the mass ratio of the (meth)acrylic acid ester monomer units relative to the total of polymerization components is 90 mass % or more" may be simply referred to as a "particular (meth) acrylic acid ester resin".

The content of the particular styrene resin in the base particles may be larger than the content of the particular (meth)acrylic acid ester resin in the base particles from the viewpoint of maintaining bondability. The content of the particular styrene resin relative to the total content of the particular styrene resin and the particular (meth)acrylic acid ester resin is preferably 55 mass % or more and 80 mass % or less, more preferably 60 mass % or more and 75 mass % or less, and yet more preferably 65 mass % or more and 70 mass % or less.

Particular Styrene Resin

The base particles that constitute the particular particles contain a particular styrene resin that contains styrene monomer unit and other vinyl monomer unit.

From the viewpoint of suppressing fluidization of the particular particles in an unpressured state, the mass ratio of styrene monomer unit relative to the total of the polymerization components of the particular styrene resin is preferably 60 mass % or more, more preferably 70 mass % or more, and yet more preferably 75 mass % or more.

From the viewpoint of forming particular particles that easily undergo pressure-induced phase transition, the mass ratio of styrene relative to the total of the polymerization components of the particular styrene resin is preferably 95 mass % or less, more preferably 90 mass % or less, and yet more preferably 85 mass % or less.

In other words, the mass ratio of styrene relative to the total of the polymerization components of the particular styrene resin is preferably 60 mass % or more and 95 mass % or less.

Examples of the vinyl monomers other than styrene monomer contained as the polymerizable components of the styrene resin (hereinafter, such monomers may also be referred to as "other vinyl monomers") include styrene-based monomers and acryl-based monomers.

Examples of the styrene-based monomers used as other vinyl monomers include vinyl naphthalene; alkyl-substituted styrenes such as α-methylstyrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, and p-n-dodecylstyrene; aryl-substituted styrenes such as p-phenylstyrene; alkoxy-substituted styrenes such as p-methoxystyrene; halogen-substituted styrenes such as p-chlorostyrene, 3,4-dichlorostyrene, p-fluorostyrene, and 2,5-difluorostyrene; and nitro-substituted styrenes such as m-nitrostyrene, o-nitrostyrene, and p-nitrostyrene.

These styrene-based monomers may be used alone or in combination.

The acryl-based monomer used as other vinyl monomers may be at least one acryl-based monomer selected from the group consisting of (meth)acrylic acid and (meth)acrylic acid esters. Examples of the (meth)acrylic acid esters include (meth)acrylic acid alkyl esters, (meth)acrylic acid carboxy-substituted alkyl esters, (meth)acrylic acid hydroxy-substituted alkyl esters, (meth)acrylic acid alkoxy-substituted alkyl esters, and di(meth)acrylic acid esters.

These acryl-based monomers may be used alone or in combination.

Examples of the (meth)acrylic acid alkyl esters include methyl (meth)acrylate, ethyl (meth)acrylate, propyl (meth)acrylate, isopropyl (meth)acrylate, n-butyl (meth)acrylate, isobutyl (meth)acrylate, n-hexyl (meth)acrylate, 2-ethylhexyl (meth)acrylate, lauryl (meth)acrylate, stearyl (meth)acrylate, cyclohexyl (meth)acrylate, dicyclopentanyl (meth)acrylate, and isobornyl (meth)acrylate.

An example of the (meth)acrylic acid carboxy-substituted alkyl ester is 2-carboxylethyl (meth)acrylate.

Examples of the (meth)acrylic acid hydroxy-substituted alkyl esters include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

An example of the (meth)acrylic acid alkoxy-substituted alkyl ester is 2-methoxyethyl (meth)acrylate.

Examples of the di(meth)acrylic acid esters include ethylene glycol di(meth)acrylate, diethylene glycol di(meth)acrylate, triethylene glycol di(meth)acrylate, butanediol di(meth)acrylate, pentanediol di(meth)acrylate, hexanediol di(meth)acrylate, nonanediol di(meth)acrylate, and decanediol di(meth)acrylate.

Examples of the (meth)acrylic acid esters also include 2-(diethylamino)ethyl (meth)acrylate, benzyl (meth)acrylate, and methoxypolyethylene glycol (meth)acrylate.

Examples of other vinyl monomers contained as the polymerization components of the particular styrene resin include, in addition to the styrene-based monomers and acryl-based monomers, (meth)acrylonitrile; vinyl ethers such as vinyl methyl ether and vinyl isobutyl ether; vinyl ketones such as vinyl methyl ketone, vinyl ethyl ketone, and vinyl isopropenyl ketone; and olefins such as isoprene, butene, and butadiene.

From the viewpoint of forming particular particles that easily undergo pressure-induced phase transition, the other vinyl monomers contained as the polymerization components of the particular styrene resin preferably contain a (meth)acrylic acid ester, more preferably a (meth)acrylic acid alkyl ester, yet more preferably a (meth)acrylic acid alkyl ester in which the alkyl group contains 2 to 10 carbon atoms, and still more preferably a (meth)acrylic acid alkyl ester in which the alkyl group contains 4 to 8 carbon atoms.

From the viewpoint of forming particular particles that easily undergo pressure-induced phase transition, the other vinyl monomers contained as the polymerization components of the particular styrene resin particularly preferably contain at least one of n-butyl acrylate and 2-ethylhexyl acrylate.

From the viewpoint of forming particular particles that easily undergo pressure-induced phase transition, the particular styrene resin and the particular (meth)acrylic acid ester resin described below may contain the same (meth) acrylic acid ester as a polymerization component.

From the viewpoint of suppressing fluidization of the particular particles in an unpressured state, the mass ratio of the (meth)acrylic acid ester relative to the total of the polymerization components of the particular styrene resin is preferably 40 mass % or less, more preferably 30 mass % or less, and yet more preferably 25 mass % or less. From the viewpoint of forming particular particles that easily undergo pressure-induced phase transition, the mass ratio is preferably 5 mass % or more, more preferably 10 mass % or more, and yet more preferably 15 mass % or more. The (meth) acrylic acid ester here is preferably a (meth)acrylic acid alkyl ester, yet more preferably a (meth)acrylic acid alkyl ester in which the alkyl group contains 2 to 10 carbon atoms, and still more preferably a (meth)acrylic acid alkyl ester in which the alkyl group contains 4 to 8 carbon atoms.

The particular styrene resin particularly preferably contains at least one of n-butyl acrylate monomer unit and 2-ethylhexyl acrylate monomer unit, and the total amount of n-butyl acrylate monomer unit and 2-ethylhexyl acrylate monomer unit relative to the total of polymerization components of the styrene resin is preferably 40 mass % or less, more preferably 30 mass % or less, and yet more preferably 25 mass % or less from the viewpoint of suppressing fluidization of the particles in an unpressured state. From the viewpoint of forming particular particles that easily undergo pressure-induced phase transition, the total amount is preferably 5 mass % or more, more preferably 10 mass % or more, and yet more preferably 15 mass % or more.

From the viewpoint of suppressing fluidization of the particular particles in an unpressured state, the weight average molecular weight of the particular styrene resin is preferably 3000 or more, more preferably 4000 or more, and yet more preferably 5000 or more. From the viewpoint of forming particular particles that easily undergo pressure-induced phase transition, the weight average molecular weight is preferably 60000 or less, more preferably 55000 or less, and yet more preferably 50000 or less.

In the present disclosure, the weight average molecular weight of a resin is measured by gel permeation chromatography (GPC). The molecular weight measurement by GPC is conducted by using HLC-8120GPC produced by TOSOH CORPORATION as a GPC instrument with columns, TSKGEL SUPER HM-M (15 cm) produced by TOSOH CORPORATION, and tetrahydrofuran as a solvent. The weight average molecular weight of a resin is calculated by using a molecular weight calibration curve prepared by using monodisperse polystyrene standard samples.

From the viewpoint of suppressing fluidization of the particular particles in an unpressured state, the glass transition temperature of the particular styrene resin is preferably 30° C. or more, more preferably 40° C. or more, and yet more preferably 50° C. or more. From the viewpoint of forming particular particles that easily undergo pressure-induced phase transition, the glass transition temperature is preferably 110° C. or less, more preferably 100° C. or less, and yet more preferably 90° C. or less.

In the present disclosure, the glass transition temperature of a resin is determined from a differential scanning calorimetry curve (DSC curve) obtained by performing differential scanning calorimetry (DSC). More specifically, the glass transition temperature is determined from the "extrapolated glass transition onset temperature" described in the method for determining the glass transition temperature in JIS K 7121:1987 "Testing Methods for Transition Temperatures of Plastics".

The glass transition temperature of a resin can be controlled by the types of monomer units and the polymerization ratios. The glass transition temperature has a tendency to decrease as the density of flexible units, such as a methylene group, an ethylene group, and an oxyethylene group, contained in the main chain increases, and has a tendency to increase as the density of rigid units, such as aromatic rings and cyclohexane rings, contained in the main chain increases. Moreover, the glass transition temperature has a tendency to decrease as the density of aliphatic groups in side chains increases.

From the viewpoint of suppressing fluidization of the particular particles in an unpressured state, the mass ratio of the particular styrene resin relative to the entire base particles is preferably 55 mass % or more, more preferably 60 mass % or more, and yet more preferably 65 mass % or more. From the viewpoint of forming particular particles that easily undergo pressure-induced phase transition, the mass ratio is preferably 80 mass % or less, more preferably 75 mass % or less, and yet more preferably 70 mass % or less.

Particular (Meth)Acrylic Acid Ester Resin

The base particles constituting the particular particles contain at least two (meth)acrylic acid ester monomer units, and the mass ratio of the (meth)acrylic acid ester monomer units relative to the total of polymerization components is 90 mass % or more.

The mass ratio of the (meth)acrylic acid ester monomer units relative to the total of the polymerization components of the (meth)acrylic acid ester resin is 90 mass % or more, preferably 95 mass % or more, more preferably 98 mass % or more, and yet more preferably 100 mass %.

Examples of the (meth)acrylic acid esters include (meth) acrylic acid alkyl esters, (meth)acrylic acid carboxy-substituted alkyl esters, (meth)acrylic acid hydroxy-substituted alkyl esters, (meth)acrylic acid alkoxy-substituted alkyl esters, and di(meth)acrylic acid esters.

Examples of the (meth)acrylic acid alkyl esters include methyl (meth)acrylate, ethyl (meth)acrylate, propyl (meth) acrylate, isopropyl (meth)acrylate, n-butyl (meth)acrylate, isobutyl (meth)acrylate, n-hexyl (meth)acrylate, 2-ethylhexyl (meth)acrylate, lauryl (meth)acrylate, stearyl (meth) acrylate, cyclohexyl (meth)acrylate, dicyclopentanyl (meth) acrylate, and isobornyl (meth)acrylate.

An example of the (meth)acrylic acid carboxy-substituted alkyl ester is 2-carboxylethyl (meth)acrylate.

Examples of the (meth)acrylic acid hydroxy-substituted alkyl esters include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth) acrylate, and 4-hydroxybutyl (meth)acrylate.

An example of the (meth)acrylic acid alkoxy-substituted alkyl ester is 2-methoxyethyl (meth)acrylate.

Examples of the di(meth)acrylic acid esters include ethylene glycol di(meth)acrylate, diethylene glycol di(meth) acrylate, triethylene glycol di(meth)acrylate, butanediol di(meth)acrylate, pentanediol di(meth)acrylate, hexanediol di(meth)acrylate, nonanediol di(meth)acrylate, and decanediol di(meth)acrylate.

Examples of the (meth)acrylic acid esters also include 2-(diethylamino)ethyl (meth)acrylate, benzyl (meth)acrylate, and methoxypolyethylene glycol (meth)acrylate.

These (meth)acrylic acid esters may be used alone or in combination.

From the viewpoint of forming particular particles that easily undergo pressure-induced phase transition and have excellent bondability, the (meth)acrylic acid esters are preferably (meth)acrylic acid alkyl esters, yet more preferably (meth)acrylic acid alkyl esters in which the alkyl group contains 2 to 10 carbon atoms, still more preferably (meth) acrylic acid alkyl esters in which the alkyl group contains 4 to 8 carbon atoms, and particularly preferably n-butyl acrylate and 2-ethylhexyl acrylate.

As described above, from the viewpoint of forming particular particles that easily undergo pressure-induced phase transition, the particular (meth)acrylic acid ester resin and the particular styrene resin may contain the same (meth) acrylic acid ester monomer unit.

From the viewpoint of forming particular particles that easily undergo pressure-induced phase transition and have excellent bondability, the mass ratio of the (meth)acrylic acid alkyl ester monomer units relative to the total of the polymerization components of the particular (meth)acrylic acid ester resin is preferably 90 mass % or more, more preferably 95 mass % or more, yet more preferably 98 mass % or more, and still more preferably 100 mass %. The (meth)acrylic acid alkyl ester monomer units here preferably each have an alkyl group having 2 to 10 carbon atoms and more preferably each have an alkyl group containing 4 to 8 carbon atoms.

From the viewpoint of forming particular particles that easily undergo pressure-induced phase transition and have excellent bondability, the mass ratio between two (meth) acrylic acid ester monomer units having the largest and second-largest mass ratios among the at least two (meth) acrylic acid ester monomer units contained in the particular (meth)acrylic acid ester resin is preferably 80:20 to 20:80, more preferably 70:30 to 30:70, and yet more preferably 60:40 to 40:60.

The two (meth)acrylic acid ester monomer units having the largest and second-largest mass ratios among the at least two (meth)acrylic acid ester monomer units contained in the particular (meth)acrylic acid ester resin are preferably (meth)acrylic acid alkyl ester monomer units. The (meth) acrylic acid alkyl ester monomer units here preferably each have an alkyl group having 2 to 10 carbon atoms and more preferably each have an alkyl group containing 4 to 8 carbon atoms.

When the two (meth)acrylic acid ester monomer units having the largest and second-largest mass ratios among the at least two (meth)acrylic acid ester monomer units contained in the particular (meth)acrylic acid ester resin are (meth)acrylic acid alkyl ester monomer units, from the viewpoint of forming particular particles that easily undergo pressure-induced phase transition and have excellent bondability, the difference in the number of carbon atoms in the alkyl group between the two (meth)acrylic acid alkyl ester monomer units is preferably 1 to 4, more preferably 2 to 4, and yet more preferably 3 or 4.

From the viewpoint of forming particular particles that easily undergo pressure-induced phase transition and have excellent bondability, the particular (meth)acrylic acid ester resin preferably contains n-butyl acrylate monomer unit and 2-ethylhexyl acrylate monomer unit. In particular, the two (meth)acrylic acid ester monomer units having the largest and second-largest mass ratios among the at least two (meth)acrylic acid ester monomer units contained as the polymerization components in the (meth)acrylic acid ester resin are preferably n-butyl acrylate monomer unit and 2-ethylhexyl acrylate monomer unit. The total amount of n-butyl acrylate monomer unit and 2-ethylhexyl acrylate monomer unit relative to the total of the polymerization components of the (meth)acrylic acid ester resin is preferably 90 mass % or more, more preferably 95 mass % or more, yet more preferably 98 mass % or more, and still more preferably 100 mass %.

The particular (meth)acrylic acid ester resin may further contain vinyl monomer units other than (meth)acrylic acid ester monomer units.

Examples of the vinyl monomers other than the (meth) acrylic acid esters include (meth)acrylic acid; styrene; styrene-based monomers other than styrene; (meth)acrylonitrile; vinyl ethers such as vinyl methyl ether and vinyl isobutyl ether; vinyl ketones such as vinyl methyl ketone, vinyl ethyl ketone, and vinyl isopropenyl ketone; and olefins such as isoprene, butene, and butadiene. These vinyl monomers may be used alone or in combination.

When the particular (meth)acrylic acid ester resin contains, as a polymerization component, a vinyl monomer other than (meth)acrylic acid esters, the vinyl monomer other than the (meth)acrylic acid esters is preferably at least one of acrylic acid and methacrylic acid and is more preferably acrylic acid.

From the viewpoint of suppressing fluidization of particles in an unpressured state, the weight average molecular weight of the particular (meth)acrylic acid ester resin is preferably 100,000 or more, more preferably 120,000 or more, and yet more preferably 150,000 or more. From the viewpoint of forming particles that easily undergo pressure-induced phase transition, the weight average molecular weight is preferably 250,000 or less, more preferably 220, 000 or less, and yet more preferably 200,000 or less.

From the viewpoint of forming particles that easily undergo pressure-induced phase transition, the glass transition temperature of the particular (meth)acrylic acid ester resin is preferably 10° C. or less, more preferably 0° C. or less, and yet more preferably −10° C. or less. From the viewpoint of suppressing fluidization of particles in an unpressured state, the glass transition temperature is preferably −90° C. or more, more preferably −80° C. or more, and yet more preferably −70° C. or more.

In this exemplary embodiment, from the viewpoint of forming particles that easily undergo pressure-induced phase transition, the mass ratio of the particular (meth)acrylic acid ester resin relative to the entire base particles is preferably 20 mass % or more, more preferably 25 mass % or more, and yet more preferably 30 mass % or more. From the viewpoint of suppressing fluidization of particles in an unpressured state, the mass ratio is preferably 45 mass % or less, more preferably 40 mass % or less, and yet more preferably 35 mass % or less.

In this exemplary embodiment, the total amount of the particular styrene resin and the particular (meth)acrylic acid ester resin contained in the base particles relative to the entire base particles is preferably 70 mass % or more, more preferably 80 mass % or more, yet more preferably 90 mass % or more, still preferably 95 mass % or more, and most preferably 100 mass %.

If needed, the base particles may contain polystyrene, non-vinyl-based resins such as epoxy resins, polyester resins, polyurethane resins, polyamide resins, cellulose resins, polyether resins, and modified rosin, or the like.

These resins may be used alone or in combination.

Other Components

The base particles may contain other components as necessary.

Examples of other components include coloring agents (for example, pigments and dyes), releasing agents (for example, hydrocarbon wax; natural wax such as carnauba wax, rice wax, and candelilla wax; synthetic or mineral or petroleum wax such as montan wax; and ester wax such as fatty acid esters and montanic acid esters), and charge controlling agents.

The particular particles may contain a coloring agent as long as the visibility of the image is not impaired.

From the viewpoint of enhancing the transparency of the particular particles, the coloring agent content in the base particles may be as small as possible. Specifically, the amount of the coloring agent relative to the entire base particles is preferably 1.0 mass % or less, more preferably 0.1 mass % or less, yet more preferably 0.01 mass % or less, and still more preferably zero.

Structure of Base Particles

The inner structure of the base particles may be a sea-island structure.

The sea-island structure may be a sea-island structure that has a sea phase containing one of the two or more binder resins, and island phases being dispersed in the sea phase and containing another one of the two or more binder resins. From the viewpoint of inducing the phase transition under pressure, more specifically, a sea-island structure that includes a sea phase containing a particular styrene resin and island phases dispersed in the sea phase and containing a particular (meth)acrylic acid ester resin is preferable. The details of the particular styrene resin contained in the sea phase and the (meth)acrylic acid ester resin contained in the island phases are as described above. Alternatively, island phases not containing a (meth)acrylic acid ester resin may be dispersed in the sea phase.

When the base particles have a sea-island structure, the average size of the island phases may be 200 nm or more and 500 nm or less. When the average size of the island phases is 500 nm or less, the base particles easily undergo pressure-induced phase transition. When the average size of the island phases is 200 nm or more, excellent mechanical strength desired for the base particles (for example, the strength that withstands deformation during stirring in a developing device) is exhibited. From these viewpoints, the average size of the island phases is more preferably 220 nm or more and 450 nm or less and yet more preferably 250 nm or more and 400 nm or less.

Examples of the method for controlling the average size of the island phases of the sea-island structure to be within the aforementioned range include increasing or decreasing the amount of the particular (meth)acrylic acid ester resin relative to the amount of the particular styrene resin and increasing or decreasing the length of time of maintaining a high temperature in the process of fusing and coalescing aggregated particles in the method for producing base particles described below.

The sea-island structure is confirmed and the average size of the island phases is measured as follows.

The particular particles are embedded in an epoxy resin, a section is prepared by using a diamond knife or the like, and the prepared section is stained with osmium tetroxide or ruthenium tetroxide in a desiccator. The stained section is observed with a scanning electron microscope (SEM). The sea phase and the island phases of the sea-island structure are distinguished by the shade created by the degree of staining with osmium tetroxide or ruthenium tetroxide, and the presence or absence of the sea-island structure is identified by the shade. From an SEM image, one hundred island phases are selected at random, a long axis of each island phase is measured, and the average of one hundred long axes is used as the average size.

The base particles may be a single structure base particles, or core-shell-structure base particles each constituted by a core and a shell layer coating the core. From the viewpoint of suppressing fluidization of the particular particles in an unpressured state, the base particles may have a core-shell structure.

From the viewpoint of inducing the phase transition under pressure, when the base particles have a core-shell structure, the core may contain the particular styrene resin and the particular (meth)acrylic acid ester resin. From the viewpoint of suppressing fluidization of the particular particles in an unpressured state, the shell layer may contain the particular styrene resin.

When the base particles have a core-shell structure, the core may have a sea phase containing the particular styrene resin and island phases containing the particular (meth)acrylic acid ester resin dispersed in the sea phase. The average size of the island phases may be within the aforementioned range. In addition to the core having the above-described structure, the shell layer may contain the particular styrene resin. In such a case, the sea phase of the core and the shell layer form a continuous structure, and the base particles easily undergo pressure-induced phase transition.

Examples of the resin contained in the shell layer also include polystyrene, and non-vinyl resins such as epoxy resins, polyester resins, polyurethane resins, polyamide resins, cellulose resins polyether resins, and modified rosin.

These resins may be used alone or in combination.

From the viewpoint of suppressing deformation of the base particles, the average thickness of the shell layer is preferably 120 nm or more, more preferably 130 nm or more, and yet more preferably 140 nm or more. From the viewpoint of inducing the phase transition of the base particles under pressure, the average thickness is preferably 550 nm or less, more preferably 500 nm or less, and yet more preferably 400 nm or less.

The average thickness of the shell layer is measured by the following method.

The particles are embedded in an epoxy resin, a section is prepared by using a diamond knife or the like, and the prepared section is stained with osmium tetroxide or ruthenium tetroxide in a desiccator. The stained section is observed with a scanning electron microscope (SEM). From an SEM image, ten base particle sections are selected at random, the thickness of the shell layer is measured at twenty positions per base particle, and the average thickness is calculated. The average value of ten base particles is used as the average thickness.

From the viewpoint of ease of handling the base particles, the volume average particle diameter (D50v) of the base particles is preferably 4 μm or more, more preferably 5 μm or more, and yet more preferably 6 μm or more. From the viewpoint of the difference in particle diameter between the base particles and the color toner, the volume average particle diameter is preferably 15 μm or less, more preferably 12 μm or less, and yet more preferably 10 μm or less.

The volume average particle diameter (D50v) of the base particles is determined by using a COULTER MULTISIZER II (produced by Beckman Coulter Inc.) with apertures having an aperture diameter of 100 μm. Into 2 mL of a 5 mass % aqueous solution of sodium alkyl benzenesulfonate, 0.5 mg or more and 50 mg or less of base particles are added and dispersed, and then the resulting dispersion is mixed with 100 mL or more and 150 mL or less of an electrolyte (ISOTON-II produced by Beckman Coulter Inc.). The resulting mixture is dispersed for 1 minute in an ultrasonic disperser, and the obtained dispersion is used as a sample. The particle diameters of 50000 particles having a particle diameter of 2 μm or more and 60 μm or less in the sample are measured. The particle diameter at 50% accumulation in a volume-based particle size distribution calculated from the small diameter side is used as the volume average particle diameter (D50v).

External Additive

An example of the external additive is inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)n$, $Al_2O_3 \cdot 2SiO_2$, $CaCO_3$, $MgCO_3$, $BaSO_4$, and $MgSO_4$.

The surfaces of the inorganic particles serving as an external additive may be hydrophobized. Hydrophobizing involves, for example, immersing inorganic particles in a hydrophobizing agent. The hydrophobizing agent may be any, and examples thereof include silane coupling agents, silicone oils, titanate coupling agents, and aluminum coupling agents. These may be used alone or in combination. The amount of the hydrophobizing agent is, for example, 1 part by mass or more and 10 parts by mass or less relative to 100 parts by mass of the inorganic particles.

Other examples of the external additive include resin particles (resin particles of polystyrene, polymethyl methacrylate, melamine resin, etc.), and cleaning activating agents (for example, particles of metal salts of higher aliphatic acids such as zinc stearate and fluorine-based high-molecular-weight materials).

The externally added amount of the external additive is preferably 0.01 mass % or more and 5 mass % or less and is more preferably 0.01 mass % or more and 2.0 mass % or less relative to the base particles.

Properties of Particular Particles

The particular particles have at least two glass transition temperatures, one of which is presumably derived from one of the two or more binder resins, and another one of which is presumably derived from another one of the two or more binder resins. As described above, when a binder resin contains a particular styrene resin and a particular (meth) acrylic acid ester resin, one of the glass transition temperatures is presumed to be that of the styrene resin, and another glass transition temperature is presumed to be that of the (meth)acrylic acid ester resin.

The particular particles may have three or more glass transition temperatures; however, the number of glass transition temperatures is preferably two. Examples of the case in which there are two glass transition temperatures include the case in which a particular styrene resin and a particular (meth)acrylic acid ester resin are the only resins contained in the particular particles, and the case in which the content of resins other than the particular styrene resin and the particular (meth)acrylic acid ester resin is small (for example, the content of other resins is 5 mass % or less relative to the entire particular particles).

The particular particles have at least two glass transition temperatures, and the difference between the lowest glass transition temperature and the highest glass transition temperature is 30° C. or more. From the viewpoint of inducing the particles to undergo phase transition under pressure, the difference between the lowest glass transition temperature and the highest glass transition temperature is preferably 40° C. or more, yet more preferably 50° C. or more, and still more preferably 60° C. or more. The upper limit of the difference between the highest glass transition temperature and the lowest glass transition temperature is, for example, 140° C. or less, and may be 130° C. or less or 120° C. or less.

From the viewpoint of inducing the particles to undergo phase transition under pressure, the lowest glass transition temperature of the particular particles is preferably 10° C. or less, more preferably 0° C. or less, and yet more preferably −10° C. or less. From the viewpoint of suppressing fluidization of particles in an unpressured state, the lowest glass transition temperature is preferably −90° C. or more, more preferably −80° C. or more, and yet more preferably −70° C. or more.

From the viewpoint of suppressing fluidization of particles in an unpressured state, the highest glass transition temperature of the particular particles is preferably 30° C. or more, more preferably 40° C. or more, and yet more preferably 50° C. or more. From the viewpoint of inducing particles to undergo phase transition under pressure, the highest glass transition temperature is preferably 70° C. or less, more preferably 65° C. or less, and yet more preferably 60° C. or less.

In the present disclosure, the glass transition temperatures of the particular particles are determined from a differential scanning calorimetry curve (DSC curve) obtained by performing differential scanning calorimetry (DSC) on a plate-shaped sample prepared by compressing the resin particles. More specifically, the glass transition temperature is determined from the "extrapolated glass transition onset temperature" described in the method for determining the glass transition temperature in JIS K 7121:1987 "Testing Methods for Transition Temperatures of Plastics".

The particular particles are particles that undergo phase transition under pressure, and satisfy formula 1 below:

$$10° C. \leq T1-T2 \qquad \text{Formula 1:}$$

In formula 1, T1 represents a temperature at which the viscosity is 10000 Pa·s at a pressure of 1 MPa, and T2 represents a temperature at which the viscosity is 10000 Pa·s at a pressure of 10 MPa. The method for determining T1 and T2 is described below.

From the viewpoint of inducing phase transition of particles under pressure, the temperature difference (T1−T2) is preferably 10° C. or more, more preferably 15° C. or more, and yet more preferably 20° C. or more. From the viewpoint of suppressing fluidization of the toner in an unpressured state, the temperature difference (T1−T2) is preferably 120° C. or less, more preferably 100° C. or less, and yet more preferably 80° C. or less.

The value of T1 is preferably 140° C. or less, more preferably 130° C. or less, yet more preferably 120° C. or less, and still more preferably 115° C. or less. The lower limit of the temperature T1 is preferably 80° C. or more and more preferably 85° C. or more.

The value of T2 is preferably 40° C. or more, more preferably 50° C. or more, and yet more preferably 60° C. or more. The upper limit of the temperature T2 may be 85° C. or less.

One indicator of how easily the particular particles undergo pressure-induced phase transition is the temperature difference (T1−T3) between the temperature T1 at which the viscosity is 10000 Pa·s at a pressure of 1 MPa and the temperature T3 at which the viscosity is 10000 Pa·s at a pressure of 4 MPa. The temperature difference (T1−T3) may be 5° C. or more. From the viewpoint of inducing the phase transition under pressure, the temperature difference (T1−T3) of the particular particles is preferably 5° C. or more and more preferably 10° C. or more.

The upper limit of the temperature difference (T1−T3) is typically 25° C. or less.

From the viewpoint of adjusting the temperature difference (T1−T3) to 5° C. or more, the temperature T3 at which the particular particles show a viscosity of 10000 Pa·s at a pressure of 4 MPa is preferably 90° C. or less, more preferably 85° C. or less, and yet more preferably 80° C. or less. The lower limit of the temperature T3 may be 60° C. or more.

The method for determining the temperature T1, the temperature T2, and the temperature T3 is as follows.

Particular particles are compressed into a pellet-shaped sample. The pellet-shaped sample is placed in a Flowtester (CFT-500 produced by Shimadzu Corporation), the applied pressure is fixed at 1 MPa, and the viscosity at 1 MPa relative to the temperature is measured. From the obtained viscosity graph, the temperature T1 at which the viscosity is $10^4$ Pa·s at an applied pressure of 1 MPa is determined. The temperature T2 is determined as with the method for determining the temperature T1 except that the applied pressure is changed from 1 MPa to 10 MPa. The temperature T3 is determined as with the method for determining the temperature T1 except that the applied pressure is changed from 1 MPa to 4 MPa. The temperature difference (T1−T2) is calculated from the temperature T1 and the temperature T2. The temperature difference (T1−T3) is calculated from the temperature T1 and the temperature T3.

Method for Producing Particular Particles

The particular particles are obtained by first producing base particles and then externally adding an externally additive to the base particles.

The base particles may be produced by a dry method (for example, a kneading and pulverizing method) or a wet method (for example, an aggregation and coalescence method, a suspension polymerization method, or a dissolution suspension method). There is no limitation on these methods, and any known method may be employed. Among these methods, the aggregation and coalescence method may be employed to produce base particles.

In the description below, a method for producing base particles by an aggregation and coalescence method is described as one example.

When the base particles are to be produced by the aggregation and coalescence method, the base particles are produced through, for example, the following processes:

a process of preparing a styrene resin particle dispersion in which styrene resin particles containing a particular styrene resin are dispersed (styrene resin particle dispersion preparation process);

a process of polymerizing a particular (meth)acrylic acid ester resin in the styrene resin particle dispersion so as to form composite resin particles containing the particular styrene resin and the particular (meth)acrylic acid ester resin (composite resin particle forming process);

a process aggregating the composite resin particles in the composite resin particle dispersion in which the composite resin particles are dispersed so as to form aggregated particles (aggregated particle forming process); and a process of heating the aggregated particle dispersion in which the aggregated particles are dispersed so as to fuse and coalesce the aggregated particles and thereby form base particles (fusing and coalescing process).

These processes will now be described in detail.

In the description below, a method for obtaining base particles free of any releasing agent is described. A releasing agent and other additives may be used as needed.

When a coloring agent and/or a releasing agent is to be contained in the base particles, in the aggregated particle forming process, a coloring agent particle dispersion and/or a releasing agent particle dispersion is mixed with the composite resin particle dispersion so as to aggregate the composite resin particles with the coloring agent and/or releasing agent to form aggregated particles.

The coloring agent particle dispersion and the releasing agent particle dispersion can each be prepared by, for example, mixing a coloring agent or a releasing agent with a dispersion medium and then performing a dispersing treatment in a known disperser machine.

Styrene Resin Particle Dispersion Preparation Process

In the styrene resin particle dispersion preparation process, a styrene resin particle dispersion in which styrene resin particles containing a particular styrene resin are dispersed is prepared.

The styrene resin particle dispersion is, for example, prepared by dispersing styrene resin particles in a dispersion medium by using a surfactant.

Examples of the dispersion medium include aqueous media such as water and alcohols. These may be used alone or in combination.

Examples of the surfactant include anionic surfactants such as sulfate esters, sulfonates, phosphate esters, and soaps; cationic surfactants such as amine salts and quaternary ammonium salts; and nonionic surfactants such as polyethylene glycol, alkyl phenol-ethylene oxide adducts, and polyhydric alcohols. A nonionic surfactant may be used in combination with an anionic surfactant or a cationic surfactant. Among these, an anionic surfactant may be used. The surfactants may be used alone or in combination.

Examples of the method for dispersing the styrene resin particles in a dispersion medium include methods that involve mixing a particular styrene resin and a dispersion medium and then dispersing the resin by stirring in a rotational shear-type homogenizer, or a mill that uses media such as a ball mill, a sand mill, or a dyno mill.

Another example of the method for dispersing styrene resin particles in a dispersion medium is an emulsion polymerization method. Specifically, after polymerization components of a particular styrene resin, and a chain transfer agent or a polymerization initiator are mixed, an aqueous medium containing a surfactant is further added to the resulting mixture, the resulting mixture is stirred to prepare an emulsion, and the styrene resin is polymerized in the emulsion. Here, the chain transfer agent may be dodecanethiol.

The volume-average particle diameter of the styrene resin particles dispersed in the styrene resin particle dispersion is preferably 100 nm or more and 250 nm or less, more preferably 120 nm or more and 220 nm or less, and yet more preferably 150 nm or more and 200 nm or less.

The volume-average particle diameter (D50v) of the resin particles contained in the resin particle dispersion is determined by measuring the particle diameter with a laser diffraction scattering particle size distribution meter (for example, LA-700 produced by Horiba Ltd.) and determining the particle diameter at 50% accumulation in a volume-based particle size distribution calculated from the small diameter side.

The styrene resin particle content in the styrene resin particle dispersion relative to the total mass of the styrene resin particle dispersion is preferably 30 mass % or more and 60 mass % or less and is more preferably 40 mass % or more and 50 mass % or less.

Composite Resin Particle Forming Process

In the composite resin particle forming process, the particular (meth)acrylic acid ester resin is polymerized in the styrene resin particle dispersion so as to form composite resin particles containing the particular styrene resin and the particular (meth)acrylic acid ester resin.

In the composite resin particle forming process, the styrene resin particle dispersion and polymerization components of the particular (meth)acrylic acid ester resin are mixed, and the particular (meth)acrylic acid ester resin is polymerized in the styrene resin particle dispersion so as to form composite resin particles containing the particular styrene resin and the particular (meth)acrylic acid ester resin.

The composite resin particles may be resin particles containing a particular styrene resin and a particular (meth) acrylic acid ester resin that are in a microphase-separated state. Such resin particles can be produced by, for example, the following method.

To a styrene resin particle dispersion, polymerization components (a group of monomers including at least two (meth)acrylic acid esters) of a particular (meth)acrylic acid ester resin are added, and, if needed, an aqueous medium is added thereto. Next, while slowly stirring the dispersion, the temperature of the dispersion is elevated to a temperature higher than or equal to the glass transition temperature of the particular styrene resin (for example, a temperature 10° C. to 30° C. higher than the glass transition temperature of the particular styrene resin). Next, while maintaining the temperature, an aqueous medium containing a polymerization initiator is slowly added dropwise, and then stirring is continued for a long time within the range of 1 to 15 hours. Here, the polymerization initiator may be ammonium persulfate.

The detailed mechanism is not clear; however, it is presumed that when the aforementioned method is employed, the monomers and the polymerization initiator penetrate into the styrene resin particles, and the particular (meth)acrylic acid esters become polymerized inside the styrene resin particles. It is presumed that because of this mechanism, composite resin particles in which the particular (meth)acrylic acid ester resin is contained inside the styrene resin particles and in which the particular styrene resin and the particular (meth)acrylic acid ester resin are in a microphase-separated state inside the particles are obtained.

The volume average particle diameter of the composite resin particles dispersed in the composite resin particle dispersion is preferably 140 nm or more and 300 nm or less, more preferably 150 nm or more and 280 nm or less, and yet more preferably 160 nm or more and 250 nm or less.

The composite resin particle content in the composite resin particle dispersion is preferably 20 mass % or more and 50 mass % or less and is more preferably 30 mass % or more and 40 mass % or less relative to the entire mass of the composite resin particle dispersion.

Aggregated Particle Forming Process

In the aggregated particle forming process, the composite resin particles in the composite resin particle dispersion are aggregated to form aggregated particles.

In the aggregated particle forming process, the composite resin particles are aggregated to form aggregated particles having diameters close to the target diameter of the base particles.

Specifically, for example, in the aggregated particle forming process, an aggregating agent is added to the composite resin particle dispersion while the pH of the composite resin particle dispersion is adjusted to acidic (for example, a pH of 2 or more and 5 or less), and after a dispersion stabilizer is added as needed, the dispersion is heated to a temperature close to the glass transition temperature of the particular styrene resin (specifically, for example, a temperature 10° C. to 30° C. lower than the glass transition temperature of the particular styrene resin) so as to aggregate the composite resin particles and form aggregated particles.

In the aggregated particle forming process, while the composite resin particle dispersion is being stirred in a rotational shear-type homogenizer, an aggregating agent may be added thereto at room temperature (for example, 25° C.) and the pH of the composite resin particle dispersion may be adjusted to acidic (for example, a pH 2 or more and 5 or less), and then heating may be performed after the dispersion stabilizer is added as needed.

Examples of the aggregating agent include a surfactant having an opposite polarity to the surfactant contained in the composite resin particle dispersion, an inorganic metal salt, and a divalent or higher valent metal complex. When a metal complex is used as the aggregating agent, the amount of the surfactant used is reduced, and the charge properties are improved.

An additive that forms a complex with a metal ion in the aggregating agent or that forms a similar bond therewith may be used in combination with the aggregating agent as needed. An example of such an additive is a chelating agent.

Examples of the inorganic metal salt include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

A water-soluble chelating agent may be used as the chelating agent. Examples of the chelating agent include oxycarboxylic acids such as tartaric acid, citric acid, and gluconic acid; and aminocarboxylic acids such as iminodiacetic acid (IDA), nitrilotriacetic acid (NTA), and ethylenediaminetetraacetic acid (EDTA).

The amount of the chelating agent added is preferably 0.01 parts by mass or more and 5.0 parts by mass or less and more preferably 0.1 parts by mass or more and less than 3.0 parts by mass relative to 100 parts by mass of the resin particles.

Fusing and Coalescence Process

In the fusing and coalescence process, the aggregated particle dispersion in which the aggregated particles are dispersed is heated so as to fuse and coalesce the aggregated particles and thereby form base particles.

In the fusing and coalescence process, the aggregated particle dispersion containing dispersed aggregated particles is heated to, for example, a temperature equal to or higher than the glass transition temperature of the particular styrene resin (for example, a temperature 10° C. to 30° C. higher than the glass transition temperature of the particular styrene resin) to fuse and coalesce the aggregated particles and form base particles.

The base particles obtained through the above-described processes usually have a sea-island structure that has a sea phase containing a particular styrene resin and island phases that are dispersed in the sea phase and contain a particular (meth)acrylic acid ester resin. It is presumed that although the particular styrene resin and the particular (meth)acrylic acid ester resin are in a microphase-separated state in the composite resin particles, the particular styrene resin is gathered in the fusing and coalescence process to form a sea phase, and the particular (meth)acrylic acid ester resin is gathered to form island phases.

The average size of the island phases of the sea-island structure can be controlled by, for example, increasing or decreasing the amount of the styrene resin particle dispersion or the amount of the at least two (meth)acrylic acid esters used in the composite resin particle forming process, or by increasing or decreasing the length of time of maintaining a high temperature in the fusing and coalescence process.

The base particles having a core-shell structure are produced through the following processes, for example:

after an aggregated particle dispersion (hereinafter may be referred to as a first aggregated particle dispersion in which first aggregated particles are dispersed) is obtained in the aforementioned aggregated particle forming process, a process of mixing the aggregated particle dispersion and a styrene resin particle dispersion so that the styrene resin particles attach to the surfaces of the aggregated particles and form second aggregated particles (second aggregated particle forming process); and a process of heating the second aggregated particle dispersion in which the second aggregated particles are dispersed so as to fuse and coalesce the second aggregated particles and thereby form base particles having a core-shell structure (core-shell structure forming process).

The base particles having a core-shell structure obtained through the aforementioned processes have a shell layer containing a particular styrene resin.

Instead of the styrene resin particle dispersion, a resin particle dispersion in which a different type of resin particles are dispersed may be used to form a shell layer that contains the different type of resin.

After completion of the fusing and coalescence process, the base particles formed in liquid are subjected to a washing process, a solid-liquid separation process, and a drying process known in the art so as to obtain dry base particles.

From the viewpoint of chargeability, the washing process may involve thorough displacement washing with ion exchange water. From the viewpoint of productivity, the solid-liquid separation process may involve suction filtration, pressure filtration, or the like. From the viewpoint of productivity, the drying process may involve freeze-drying, flash-drying, fluid-drying, vibration-type fluid-drying, or the like.

The particular particles are formed by, for example, adding an external additive to the obtained dry base particles, and mixing the resulting mixture.

Mixing may be performed by using a V blender, a Henschel mixer, a Loedige mixer, or the like.

If needed, a vibrating screen, an air screen, or the like may be used to remove coarse particles.

Electrostatic Charge Image Developer Containing Particular Particles

The electrostatic charge image developer containing the particular particles may be a one-component developer that contains only the particular particles, or a two-component developer that is a mixture of the particular particles and a carrier.

The carrier is not particularly limited and may be any known carrier. Examples of the carrier include a coated carrier prepared by covering the surface of a magnetic powder core with a resin, a magnetic powder-dispersed carrier prepared by dispersing and blending magnetic powder in a matrix resin, and a resin-impregnated carrier prepared by impregnating porous magnetic powder with a resin. The magnetic powder-dispersed carrier and the resin-impregnated carrier may each be a carrier that has a core being composed of the particles constituting the carrier and having a resin-coated surface.

Examples of the magnetic powder include magnetic metals such as iron, nickel, and cobalt, and magnetic oxides such as ferrite and magnetite.

Examples of the resin for coating and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylate copolymer, a straight silicone resin containing an organosiloxane bond and modified products thereof, fluororesin, polyester, polycarbonate, phenolic resin, and epoxy resin. The resin for coating and the matrix resin may contain other additives, such as conductive particles. Examples of the conductive particles include particles of metals such as gold, silver, and copper, and particles of carbon black, titanium oxide, zinc oxide, tin oxide, barium sulfate, aluminum borate, and potassium titanate.

An example of the method for covering the surface of the core with the resin is a method that involves coating the surface of the core with a coating layer-forming solution prepared by dissolving the resin for coating and various additives (used as needed) in an appropriate solvent. The solvent is not particularly limited and may be selected by considering the type of the resin to be used, suitability of application, etc.

Specific examples of the resin coating method include a dipping method involving dipping cores in the coating-layer-forming solution, a spraying method involving spraying the coating-layer-forming solution onto core surfaces, a fluid bed method involving spraying a coating-layer-forming solution while having the cores float on a bed of air, and a kneader coater method involving mixing cores serving as carriers and a coating-layer-forming solution in a kneader coater and then removing the solvent.

In a two component developer, the particular particles-to-carrier mixing ratio (mass ratio) is preferably 1:100 to 30:100 and is more preferably 3:100 to 20:100.

EXAMPLES

The exemplary embodiments of the present disclosure will now be described in detail through examples, but the present disclosure is not limited by these examples. In the description below, "parts" and "%" are on a mass basis unless otherwise noted.

Preparation of Dispersion Containing Styrene Resin Particles

Preparation of Styrene Resin Particle Dispersion (St1)

Styrene: 390 parts n-Butyl acrylate: 100 parts

Acrylic acid: 10 parts

Dodecanethiol: 7.5 parts

The above-described materials are mixed and dissolved to prepare a monomer solution.

In 205 parts of ion exchange water, 8 parts of an anionic surfactant (DOWFAX 2A1 produced by The Dow Chemical Company) is dissolved, and is dispersed and emulsified by adding the aforementioned monomer solution to obtain an emulsion.

In 462 parts of ion exchange water, 2.2 part of an anionic surfactant (DOWFAX 2A1 produced by The Dow Chemical Company) is dissolved. The resulting solution is charged into a polymerization flask equipped with a stirrer, a thermometer, a reflux cooling tube, and a nitrogen inlet tube and is heated to 73° C. under stirring, and the temperature is retained thereat.

In 21 parts of ion exchange water, 3 parts of ammonium persulfate is dissolved, and the resulting solution is added dropwise to the polymerization flask for 15 minutes via a metering pump. Then, the emulsion is added dropwise thereto for 160 minutes via a metering pump.

Subsequently, while slow stirring is continued, the polymerization flask is retained at 75° C. for 3 hours, and then the temperature is returned to room temperature.

As a result, a styrene resin particle dispersion (St1) that contains styrene resin particles having a volume-average particle diameter (D50v) of 174 nm, a weight average molecular weight of 49 k as determined by GPC (UV detection), and a glass transition temperature of 54° C., and that has a solid content of 42% is obtained.

The styrene resin particle dispersion (St1) is dried to obtain styrene resin particles, and the thermal behavior in the temperature range of −150° C. to 100° C. is analyzed with a differential scanning calorimeter (DSC-60A produced by Shimadzu Corporation). One glass transition temperature is observed. Table 1 indicates the glass transition temperature.

Preparation of Styrene Resin Particle Dispersion (St2)

A styrene resin particle dispersion (St2) is prepared as with the styrene resin particle dispersion (St1) except that the monomers are changed as indicated in Table 1.

In Table 1, the monomers are abbreviated as follows.
Styrene: St, n-butyl acrylate: BA, acrylic acid: AA

TABLE 1

| | Styrene resin particle dispersion | | | | | |
|---|---|---|---|---|---|---|
| | Polymerization components (mass ratio) | | | D50v of resin particles | Mw | Tg |
| No. | St | BA | AA | [nm] | (k) | [° C.] |
| St1 | 78 | 20 | 2 | 174 | 49 | 54 |
| St2 | 88 | 10 | 2 | 170 | 50 | 76 |

Preparation of Dispersion Containing Composite Resin Particles
Preparation of Composite Resin Particle Dispersion (M1)
    Styrene resin particle dispersion (St1): 1190 parts (solid content: 500 parts)
    2-Ethylhexyl acrylate: 250 parts
    n-Butyl acrylate: 250 parts
    Ion exchange water: 982 parts The above-described materials are charged into a polymerization flask, stirred at 25° C. for 1 hour, and heated to 70° C.

In 75 parts of ion exchange water, 2.5 parts of ammonium persulfate is dissolved, and the resulting solution is added dropwise to the aforementioned polymerization flask for 60 minutes via a metering pump.

Subsequently, while slow stirring is continued, the polymerization flask is retained at 70° C. for 3 hours, and then the temperature is returned to room temperature.

As a result, a composite resin particle dispersion (M1) that contains composite resin particles having a volume average particle diameter (D50v) of 219 nm and a weight average molecular weight of 219 k as determined by GPC (UV detection) and that has a solid content of 32% is obtained.

The composite resin particle dispersion (M1) is dried to obtain composite resin particles, and the thermal behavior in the temperature range of −150° C. to 100° C. is analyzed with a differential scanning calorimeter (DSC-60A produced by Shimadzu Corporation). Two glass transition temperatures are observed. Table 2 indicates the glass transition temperatures.

Preparation of Composite Resin Particle Dispersion (M2)

A composite resin particle dispersion (M2) is prepared as with the composite resin particle dispersion (M1) except that the styrene resin particle dispersion (St1) is changed to the styrene resin particle dispersion (St2) as indicated in Table 2.

In Table 2, the monomers are abbreviated as follows.
Styrene: St, n-butyl acrylate: BA, 2-ethylhexyl acrylate: 2EHA, acrylic acid: AA, (meth)acrylic acid ester resin: Ac resin

TABLE 2

| Composite resin particle dispersion | | | | | | | Composite resin particles | | |
|---|---|---|---|---|---|---|---|---|---|
| | | St resin | | Ac resin | | St resin/Ac resin mass ratio [St:Ac] | D50v of resin particle [nm] | Mw (k) | Tg |
| No. | Dispersion No. | Polymerization components | Tg [° C.] | Polymerization components | | | | | [° C.] [° C.] |
| M1 | St1 | St/BA/AA = 78/20/2 | 54 | 2EHA/BA = 50/50 | | 50:50 | 219 | 219 | −52  54 |
| M2 | St2 | St/BA/AA = 88/10/2 | 76 | 2EHA/BA = 50/50 | | 50:50 | 218 | 240 | −52  76 |

Preparation of Particular Particles
Preparation of Particular Particles (1) and Developer (1)
    Composite resin particle dispersion (M1): 504 parts
    Ion exchange water: 710 parts
    Anionic surfactant (DOWFAX 2A1 produced by The Dow Chemical Company): 1 part The above-described materials are placed in a reactor equipped with a thermometer and a pH meter, and the pH is adjusted to 3.0 by adding a 1.0% aqueous nitric acid solution at a temperature of 25° C. Then, while the resulting mixture is dispersed in a homogenizer (ULTRA-TURRAX T50 produced by IKA Japan) at a number of rotation of 5000 rpm, 23 parts of a 2.0% aqueous aluminum sulfate solution is added. Subsequently, a stirrer and a heating mantle are attached to the reactor. The temperature is elevated at a temperature elevation rate of 0.2° C./minute up to a temperature of 40° C. and then at 0.05° C. beyond 40° C. The particle diameter is measured every 10 minutes with MULTISIZER II (aperture diameter: 50 μm, produced by Beckman Coulter Inc.). The temperature is retained when the volume average particle diameter reached 5.0 μm, and 170 parts of the styrene resin particle dispersion (St1) is added thereto for 5 minutes. After completion of addition, a temperature of 50° C. is retained for 30 minutes, a 1.0% aqueous sodium hydroxide solution is added thereto, and the pH of the slurry is adjusted to 6.0. Subsequently, while the pH is adjusted to 6.0 every 5° C., the temperature is elevated at a temperature elevation rate of 1° C./minute up to 90° C., and the temperature is retained at 90° C. The particle shape and the surface property are observed with an optical microscope and a field emission-type scanning electron microscope (FE-SEM), and coalescence of particles is confirmed at the 10th hour. The reactor is then cooled with cooling water for 5 minutes to 30° C.

The cooled slurry is passed through a nylon mesh having an aperture of 15 μm to remove coarse particles, and the slurry that has passed through the mesh is filtered at a reduced pressure by using an aspirator. The solid matter remaining on the paper filter is manually pulverized as finely as possible and is added to ion exchange water (temperature: 30° C.) in an amount ten times the amount of the solid matter. The resulting mixture is stirred for 30 minutes. Subsequently the solid matter remaining on the paper filter after filtration at a reduced pressure in an aspirator is pulverized manually as finely as possible and is added to ion exchange water (temperature: 30° C.) in an amount ten times the amount of the solid matter. The resulting mixture is stirred for 30 minutes and is again filtered at a reduced pressure with an aspirator. The electrical conductivity of the filtrate is measured. This operation is repeated until the electrical conductivity of the filtrate is 10 μS/cm or less so as to wash the solid matter.

The washed solid matter is finely pulverized in a wet-dry-type particle sizer (Comil) and then vacuum-dried in an oven at 25° C. for 36 hours. As a result, base particles (1) are obtained. The volume average particle diameter of the base particles (1) is 8.0 μm.

One hundred parts of the base particles (1) and 1.5 parts of hydrophobic silica (RY50 produced by Nippon Aerosil Co., Ltd.) are mixed in a sample mill at a rotation rate of 13000 rpm for 30 seconds. The mixture is then screened through a vibrating screen having an aperture of 45 μm. As a result, particular particles (1) are obtained.

Using the particular particles (1) as a sample, the thermal behavior in the temperature range of −150° C. to 100° C. is analyzed with a differential scanning calorimeter (DSC-60A produced by Shimadzu Corporation). Two glass transition temperatures are observed. Table 3 indicates the glass transition temperatures.

Mn—Mg—Sr-based ferrite particles (average particle diameter: 40 μm: 100 parts
Toluene: 14 parts
Polymethyl methacrylate: 2 parts
Carbon black (VXC72 produced by Cabot Corporation): 0.12 parts Glass beads (diameter: 1 mm, in an amount equal to the amount of toluene) and the above-described materials other than the ferrite particles are mixed, and the resulting mixture is stirred in a sand mill produced by KANSAI PAINT CO., LTD., at a rotation rate of 1200 rpm for 30 minutes. As a result, a dispersion is obtained. The dispersion and the ferrite particles are placed in a vacuum deaerator-type kneader, and the resulting mixture is dried at a reduced pressure under stirring to obtain a resin-coated carrier.

Preparation of Particular Particles (2) and Developer (2)

Particular particles (2) and a developer (2) are prepared as with the preparation of the particular particles (1) except that the composite resin particle dispersion and the styrene resin particle dispersion are changed as indicated in Table 3.

The temperature T1 and the temperature T2 of the particular particles (2) are measured with the aforementioned measuring method, and the particles (2) satisfy formula 1, "10° C.≤T1−T2".

Evaluation of Pressure-Responsive Phase Transition

The temperature difference (T1−T3), which is the indicator of how easily the particles undergo pressure-induced phase transition, is determined. For each particle sample, the temperature T1 and the temperature T3 are measured with a Flowtester (CFT-500 produced by Shimadzu Corporation), and the temperature difference (T1−T3) is calculated. Table 3 indicates the temperature difference (T1−T3).

TABLE 3

| Particular particles | Core | | | | Shell layer St resin particle dispersion | Measured values | | | | | | |
|---|---|---|---|---|---|---|---|---|---|---|---|---|
| | Composite resin particle dispersion | Polymerization components of St resin | Polymerization components of Ac resin | St resin/Ac resin mass ratio [St:Ac] | | D50v [μm] | Average size of island phases [nm] | Tg [° C.] | Tg [° C.] | Difference in Tg [° C.] | T3 [° C.] | Temperature difference (T1 − T3) [° C.] |
| (1) | M1 | St/BA/AA = 78/20/2 | 2EHA/BA = 50/50 | 50:50 | St1 | 8.0 | 200 | −52 | 54 | 106 | 75 | 15 |
| (2) | M2 | St/BA/AA = 88/10/2 | 2EHA/BA = 50/50 | 50:50 | St2 | 11.0 | 250 | −52 | 76 | 128 | 70 | 13 |

The temperature T1 and the temperature T2 of the particular particles (1) are measured with the aforementioned measuring method, and the particles (1) satisfy formula 1, "10° C.≤T1−T2".

A section of the particular particles (1) is observed with a scanning electron microscope (SEM). A sea-island structure is observed. The particular particles (1) have a core in which island phases are present, and a shell layer in which no island phases are present.

The sea phase contains a particular styrene resin, and the island phases contain a particular (meth)acrylic acid ester resin. The average size of the island phases is determined by the aforementioned measuring method. The average size of the island phases is indicated in Table 3.

Into a V-type blender, 10 parts of the particular particles (1) are placed and 100 parts of the following resin-coated carrier are placed, and the resulting mixture is stirred for 20 minutes. Then the mixture is screened through a vibrating screen having an aperture of 212 μm to obtain a developer (1).

Example 1

A press-bonded printed material is formed by using the following system for forming a printed material, and the developer (1) containing the particular particles (1) or the developer (2) containing the particular particles (2).

Specifically, an apparatus of a type illustrated in FIGURE is prepared as the system for forming a printed material by performing the forming to pressurizing. In other words, there is prepared a system for forming a printed material, the system equipped with a five-stand-tandem intermediate transfer-type printing unit that performs placement of the particular particles and formation of color images on a recording medium, and a press-bonding unit that has a folding device and a pressurizing device.

A toner (1), which is the particular particles, a yellow toner, a magenta toner, a cyan toner, and a black toner are respectively placed in five developing devices in the printing unit. Commercially available products produced by Fuji Xerox Co., Ltd. are used as the yellow toner, the magenta toner, the cyan toner, and the black toner.

The following five types of recording media (A) to (E) are prepared.
(A): Ncolor 104 paper produced by Fuji Xerox Co., Ltd., basis weight: 104.7 g/m²
(B): Ncolor 127 paper produced by Fuji Xerox Co., Ltd., basis weight: 127.9 g/m²
(C): Ncolor 157 paper produced by Fuji Xerox Co., Ltd., basis weight: 157 g/m²
(D): Leathac 66 paper produced by Fuji Xerox Co., Ltd., basis weight: 151 g/m²
(E): OS coat paper produced by Fuji Xerox Co., Ltd., basis weight: 127.9 g/m²

The image to be formed on a recording medium is an image having an area density of 30% in which black characters and a full-color photographic image are both contained. The image is formed on one surface of the recording medium (forming and applying). The amount of the particular particles applied is 3.8 g/m² in an image-forming region of an image-forming surface of the recording medium.

Toner images formed of color toners and a toner image formed of the particular particles formed on the recording medium are heated by using a heating and pressurizing device (heating). The set temperature of the member that contacts the toner images (heating roll) is 160° C.

The folding device is a device that folds the recording medium in two such that the surface on which the image is formed is arranged on the inner side.

The pressurizing device is a pair of rolls separated from each other by an interval C of 0.12 mm, the processing speed is 80 m/minute, and the pressure applied to the multilayer body is 90 MPa (pressurizing).

Ten press-bonded printed materials are continuously formed by using the above-described apparatus under the above-described conditions, each by folding a recording medium in two with the image-formed surface arranged on the inner side and then bonding the image-formed surfaces of the flaps of the recording medium.

Examples 2 to 9 and Comparative Examples 1 and 2

Press-bonded printed materials are formed by the aforementioned system for forming a printed material as in Example 1 except that the conditions in the heating and pressurizing are changed as indicated in Table 4.

Evaluation of Peel Strength

The tenth press-bonded printed material is cut in the long side direction at a width of 15 mm to prepare a rectangular test piece, and the test piece is subjected to the 90 degrees peel test. The peeling speed of the 90 degrees peel test is set to 20 mm/minute, the load (N) from 10 mm to 50 mm is sampled at 0.4 mm intervals after start of the measurement, the average of the results is calculated, and the loads (N) observed from three test pieces are averaged. The load (N) required for peeling is categorized as follows. The results are indicated in Table 3.

G1: 1.0 N or more
G2: 0.8 N or more but less than 1.0 N
G3: 0.5 N or more but less than 0.8 N
G4: 0.2 N or more but less than 0.5 N
G5: less than 0.2 N or press bonding is unsuccessful

TABLE 4

| | Particular particles No. | Heating | | | Pressurizing | | Peel strength according to recording medium | | | | |
|---|---|---|---|---|---|---|---|---|---|---|---|
| | | Whether heating is performed | Set temperature [° C.] | Whether pressure is applied | Interval C [mm] | Pressure [MPa] | (A) | (B) | (C) | (D) | (E) |
| Example 1 | (1) | Yes | 160 | Yes | 0.12 | 85 | G2 | G1 | G1 | G2 | G2 |
| Example 2 | (1) | Yes | 140 | Yes | 0.12 | 85 | G3 | G2 | G1 | G3 | G2 |
| Example 3 | (1) | Yes | 195 | Yes | 0.12 | 85 | G2 | G1 | G1 | G1 | G1 |
| Example 4 | (1) | Yes | 160 | Yes | 0.02 | 115 | G2 | G1 | G1 | G1 | G2 |
| Example 5 | (1) | Yes | 160 | Yes | 0.40 | 50 | G4 | G3 | G2 | G3 | G3 |
| Example 6 | (1) | Yes | 195 | Yes | 0.02 | 115 | G1 | G1 | G1 | G1 | G1 |
| Example 7 | (1) | Yes | 140 | Yes | 0.40 | 50 | G4 | G4 | G3 | G4 | G4 |
| Example 8 | (2) | Yes | 195 | Yes | 0.40 | 50 | G4 | G3 | G2 | G3 | G3 |
| Example 9 | (1) | Yes | 140 | Yes | 0.02 | 115 | G4 | G2 | G2 | G3 | G3 |
| Comparative Example 1 | (1) | No | — | — | 0.02 | 115 | G5 | G5 | G4 | G5 | G4 |
| Comparative Example 2 | (1) | No | — | — | 0.40 | 50 | G5 | G5 | G5 | G5 | G5 |

As apparent from Table 3 above, compared to Comparative Examples 1 and 2, Examples 1 to 9 exhibit high peel strength in all of the five types of recording media.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A method for forming a printed material, the method comprising:
    forming an image on a recording medium;
    applying particles to a surface of the recording medium, the surface having the image formed thereon;
    heating the particles applied to the recording medium; and
    pressurizing, in a thickness direction, a multilayer body obtained by folding the recording medium so that the heated particles are sandwiched between flaps of the recording medium or a multilayer body obtained by placing another recording medium on top of the recording medium with the heated particles therebetween, wherein the particles contain a styrene resin and a (meth) acrylic acid ester resin, the (meth)acrylic acid ester resin contains two (meth) acrylic acid ester monomer units, and a mass ratio of the (meth)acrylic acid ester monomer units relative to a total of polymerization components is 90 mass % or more, the particles have two glass transition temperatures, and a difference between the lowest glass transition temperature and the highest glass transition temperature is 30° C. or more, and the applying comprises electrophotographically applying the particles to the recording medium by using an electrostatic charge image developer containing the particles.

2. The method for forming a printed material according to claim 1, wherein the heating involves heating the particles by causing a member to contact the particles, the member having a surface having a set temperature in a range of 130° C. to 200° C.

3. The method for forming a printed material according to claim 1, wherein the heating further involves pressurizing the particles.

4. The method for forming a printed material according to claim 1, wherein the pressurizing involves pressurizing the multilayer body in the thickness direction by causing the multilayer body to pass between a pair of rolls separated from each other by an interval C, and the interval C is in a range of 0.01 mm to 0.40 mm.

5. The method for forming a printed material according to claim 1, wherein, in the pressurizing, a pressure applied in the thickness direction of the multilayer body is in a range of 48 MPa to 120 MPa as measured by using a pressure measuring film.

6. The method for forming a printed material according to claim 1, wherein the electrostatic charge image developer contains color particles, and the forming involves using the electrostatic charge image developer to electrophotographically form the image formed of the color particles on the recording medium.

7. The method for forming a printed material according to claim 6, wherein a ratio ($D_B/D_A$) of a volume average particle diameter $D_B$ of the particles used in the applying to a volume average particle diameter $D_A$ of the color particles used in the forming is in a range of 0.5 to 3.0.

8. The method for forming a printed material according to claim 1, wherein a ratio of styrene monomer unit to a total of polymerization components of the styrene resin in the particles is in a range of 60 mass % to 95 mass %.

9. The method for forming a printed material according to claim 1, wherein a mass ratio between the two (meth)acrylic acid ester monomer units contained as polymerization components in the (meth)acrylic acid ester resin in the particles is in a range of 80:20 to 20:80.

10. The method for forming a printed material according to claim 1, wherein the (meth)acrylic acid ester resin in the particles contains two (meth)acrylic acid alkyl ester monomer units, and a difference in the number of carbon atoms in an alkyl group between the two (meth)acrylic acid alkyl ester monomer units is in a range of 1 to 4.

11. The method for forming a printed material according to claim 1, wherein the styrene resin in the particles further contains a (meth)acrylic acid ester monomer unit.

12. The method for forming a printed material according to claim 11, wherein the (meth)acrylic acid ester monomer unit contained as a polymerization component in the styrene resin is selected from n-butyl acrylate and 2-ethylhexyl acrylate.

13. The method for forming a printed material according to claim 1, wherein the styrene resin and the (meth)acrylic acid ester resin in the particles contain the same (meth) acrylic acid ester monomer unit.

14. The method for forming a printed material according to claim 1, wherein the (meth)acrylic acid ester resin contains 2-ethylhexyl acrylate monomer unit and n-butyl acrylate monomer unit.

15. The method for forming a printed material according to claim 1, wherein the particles have a sea phase containing the styrene resin and island phases containing the (meth) acrylic acid ester resin and being dispersed in the sea phase.

16. The method for forming a printed material according to claim 15, wherein the island phases have an average size in a range of 200 nm to 500 nm.

17. The method for forming a printed material according to claim 1, wherein a temperature at which the particles exhibit a viscosity of 10000 Pas at a pressure of 4 MPa is 90° C. or less.

18. A system for forming a printed material, the system comprising:

an image forming unit that forms an image on a recording medium;

a particle applying unit that electrophotographically applies particles to the recording medium having the image formed thereon;

a particle heating unit that heats the particles applied to the recording medium; and a multilayer body pressurizing unit that pressurizes, in a thickness direction, a multilayer body obtained by folding the recording medium so that the heated particles are sandwiched between flaps of the recording medium or a multilayer body obtained by placing another recording medium on top of the recording medium with the heated particles therebetween, wherein the particles contain a styrene resin and a (meth) acrylic acid ester resin, the (meth)acrylic acid ester resin contains two (meth) acrylic acid ester monomer units, and a mass ratio of the (meth)acrylic acid ester monomer units relative to a total of polymerization components is 90 mass % or more, and the particles have two glass transition temperatures, and a difference between the lowest glass transition temperature and the highest glass transition temperature is 30° C. or more.

* * * * *